(12) United States Patent
Curry et al.

(10) Patent No.: US 8,702,036 B2
(45) Date of Patent: Apr. 22, 2014

(54) SYSTEM FOR OVERHEAD STORAGE OF CARGO CONTAINERS IN UPPER LOBE OF AIRCRAFT

(76) Inventors: James M. Curry, Lake Stevens, WA (US); Randolph Schemkes, Snohomish, WA (US)

( * ) Notice: Subject to any disclaimer, the term of this patent is extended or adjusted under 35 U.S.C. 154(b) by 0 days.

(21) Appl. No.: 13/317,493

(22) Filed: Oct. 18, 2011

(65) Prior Publication Data

US 2012/0160961 A1    Jun. 28, 2012

Related U.S. Application Data

(60) Provisional application No. 61/455,369, filed on Oct. 18, 2010, provisional application No. 61/458,756, filed on Nov. 30, 2010.

(51) Int. Cl.
  *B64C 1/22*    (2006.01)
(52) U.S. Cl.
  USPC ............. 244/118.1; 244/118.5; 244/119
(58) Field of Classification Search
  USPC ............ 244/118.1, 118.5, 118.2, 118.6, 119, 244/137.1, 137.2; 198/465.1
  See application file for complete search history.

(56) References Cited

U.S. PATENT DOCUMENTS

| | | | | |
|---|---|---|---|---|
| 3,019,757 | A * | 2/1962 | Bailey | 114/72 |
| 3,028,130 | A | 4/1962 | Burton | |
| 4,287,967 | A * | 9/1981 | Perkins | 187/268 |
| 4,653,707 | A * | 3/1987 | Hamilton et al. | 244/137.2 |
| 5,314,143 | A * | 5/1994 | Luria | 244/118.1 |
| 5,413,292 | A * | 5/1995 | Luria | 244/118.1 |
| 5,868,544 | A * | 2/1999 | Cox | 414/659 |
| 6,808,142 | B2 * | 10/2004 | Oki | 244/118.1 |
| 2008/0078872 | A1 * | 4/2008 | Schalla et al. | 244/118.5 |
| 2008/0283665 | A1 * | 11/2008 | Rouyre | 244/119 |
| 2009/0321564 | A1 * | 12/2009 | Schuld et al. | 244/118.5 |
| 2011/0011978 | A1 * | 1/2011 | Haack et al. | 244/119 |
| 2012/0126056 | A1 * | 5/2012 | Curry et al. | 244/118.1 |
| 2012/0160961 | A1 * | 6/2012 | Curry et al. | 244/118.1 |
| 2012/0260300 | A1 * | 10/2012 | Bower et al. | 725/118 |
| 2012/0298799 | A1 * | 11/2012 | Grosse-Plankermann et al. | 244/119 |

FOREIGN PATENT DOCUMENTS

| | | |
|---|---|---|
| DE | 3501887 | 1/1985 |
| EP | 1 211 174 | 6/2002 |
| WO | WO95/23733 | 9/1995 |

* cited by examiner

*Primary Examiner* — Christopher P Ellis
*Assistant Examiner* — Medhat Badawi
(74) *Attorney, Agent, or Firm* — Todd N. Hathaway

(57) ABSTRACT

A cargo storage and handling system for aircraft. A rack assembly mounts in an upper portion of the fuselage to form a cargo area in the upper lobe thereof. The rack includes a series of frames that are suspended from pre-existing attachment points for luggage bins. Cargo rails mounted on the frames support containers for movement through the upper lobe cargo area. Cargo may be raised to the upper lobe cargo area from the main deck of the aircraft using a lift apparatus. The lift apparatus includes a platform that is raised/lowered by a lift mechanism, the lift mechanism being mounted to/or enclosed within a barrier between the cargo and personnel areas of the aircraft, such as a 9G Barrier. A cover apparatus closes a cargo hole in the main deck of the aircraft for personnel safety. The cover apparatus includes a plurality of the elongate plate members that are mounted to underfloor portions of the seat tracks of the main deck of the aircraft so as to be selectively extensible/retractable into and out of the opening.

15 Claims, 25 Drawing Sheets

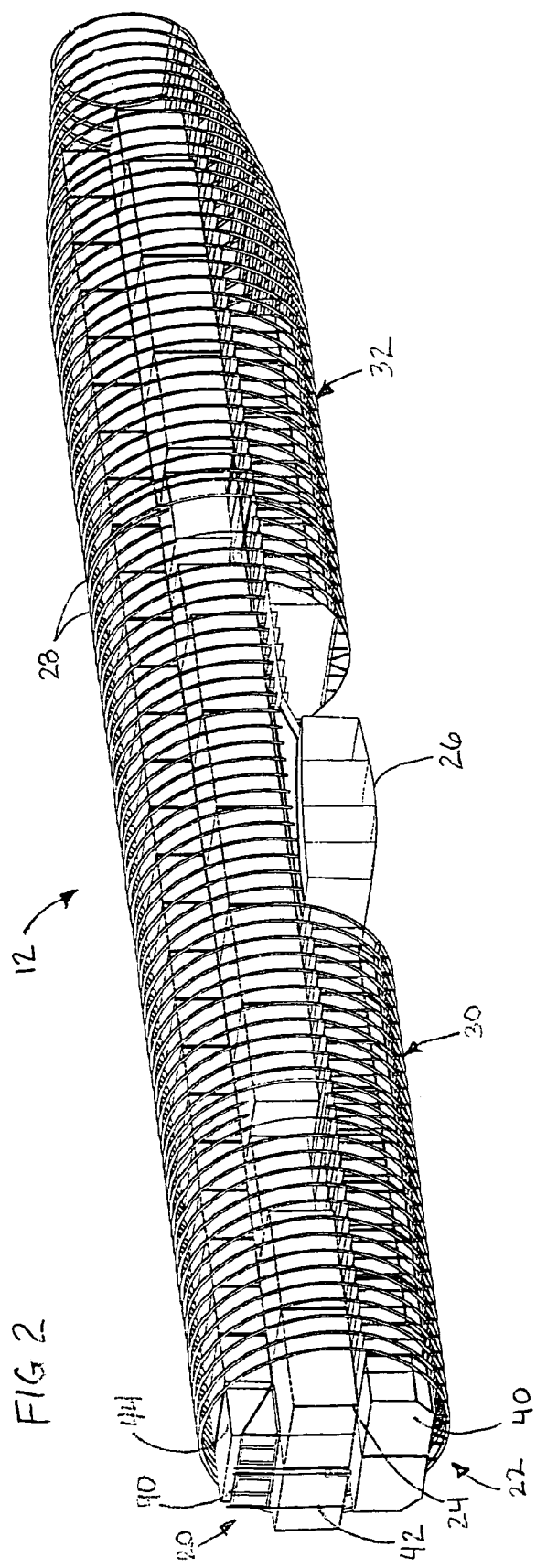

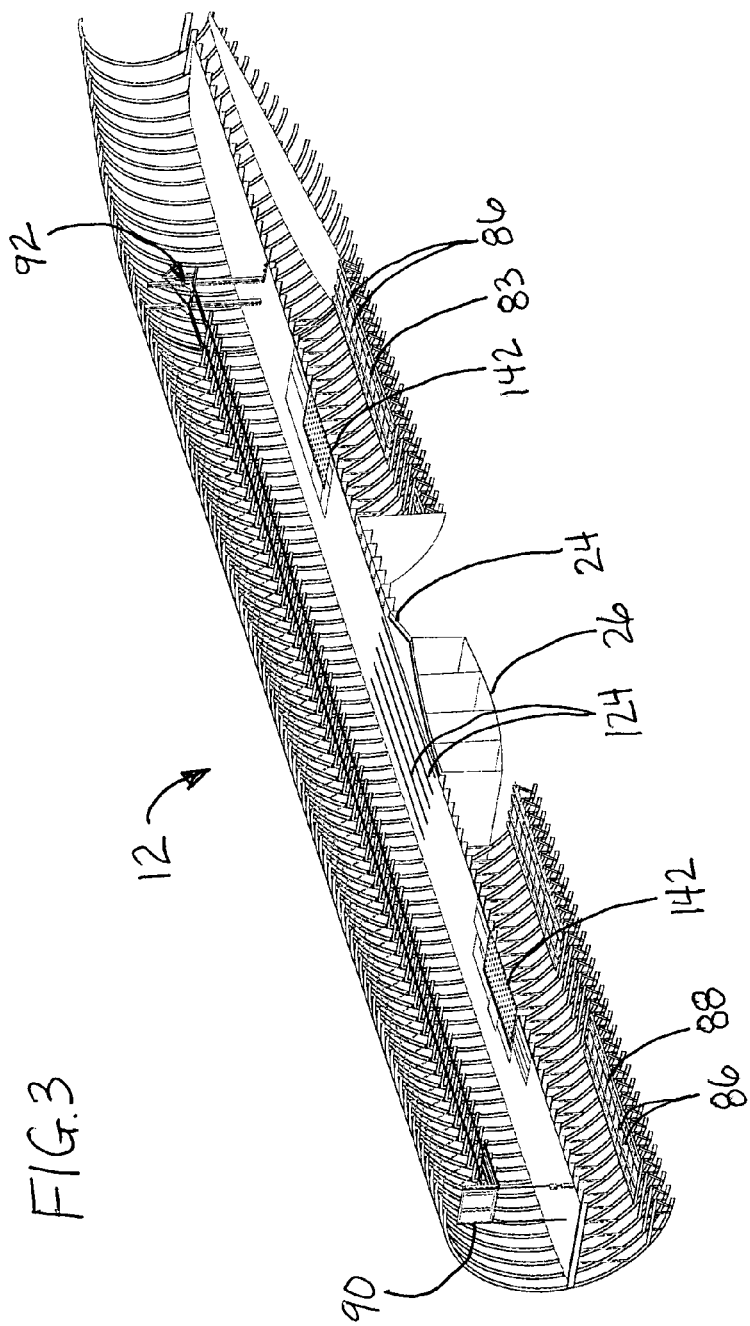

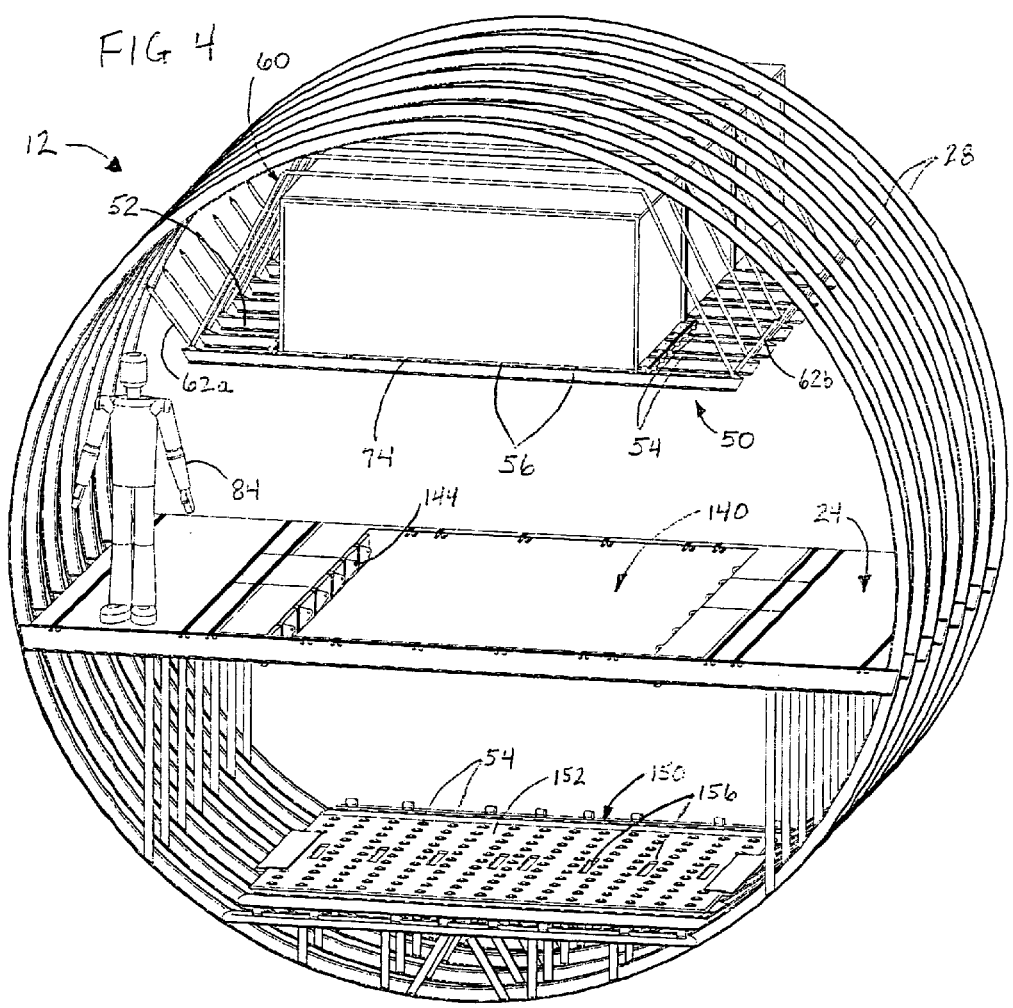

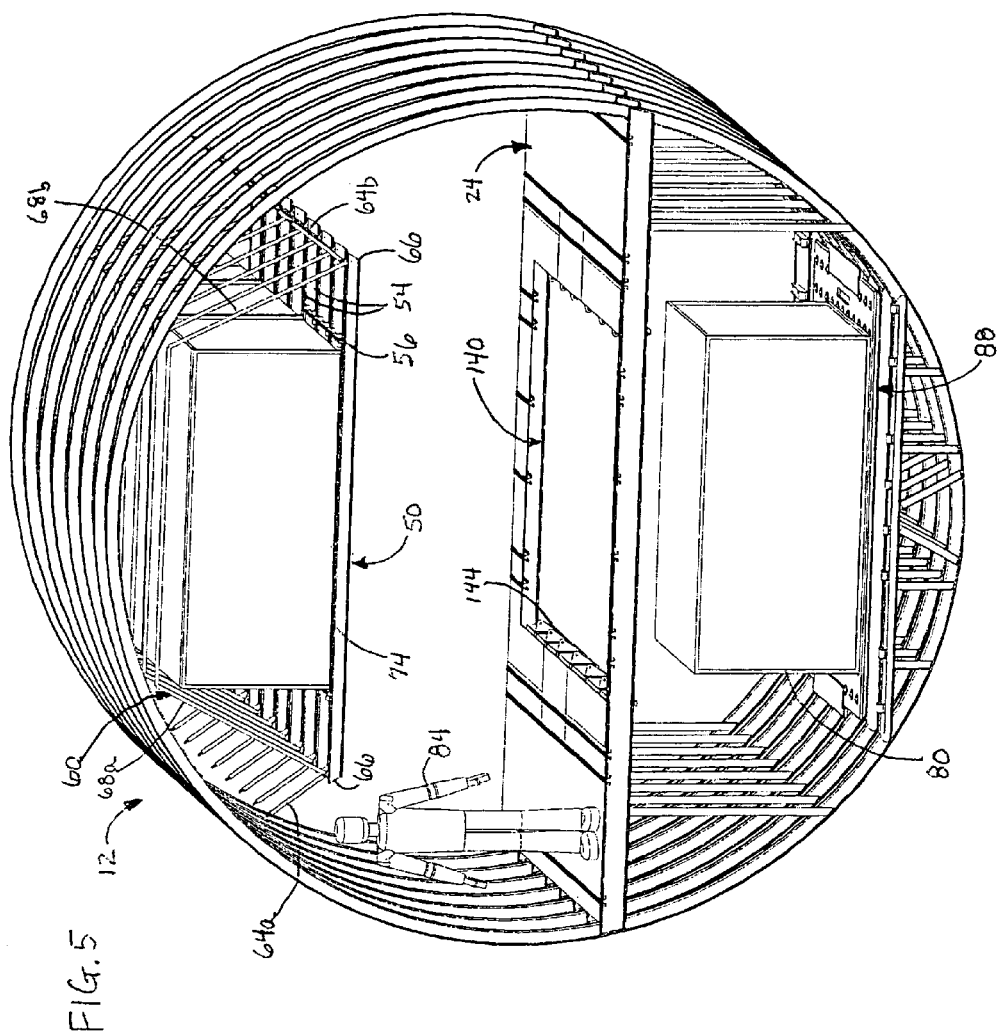

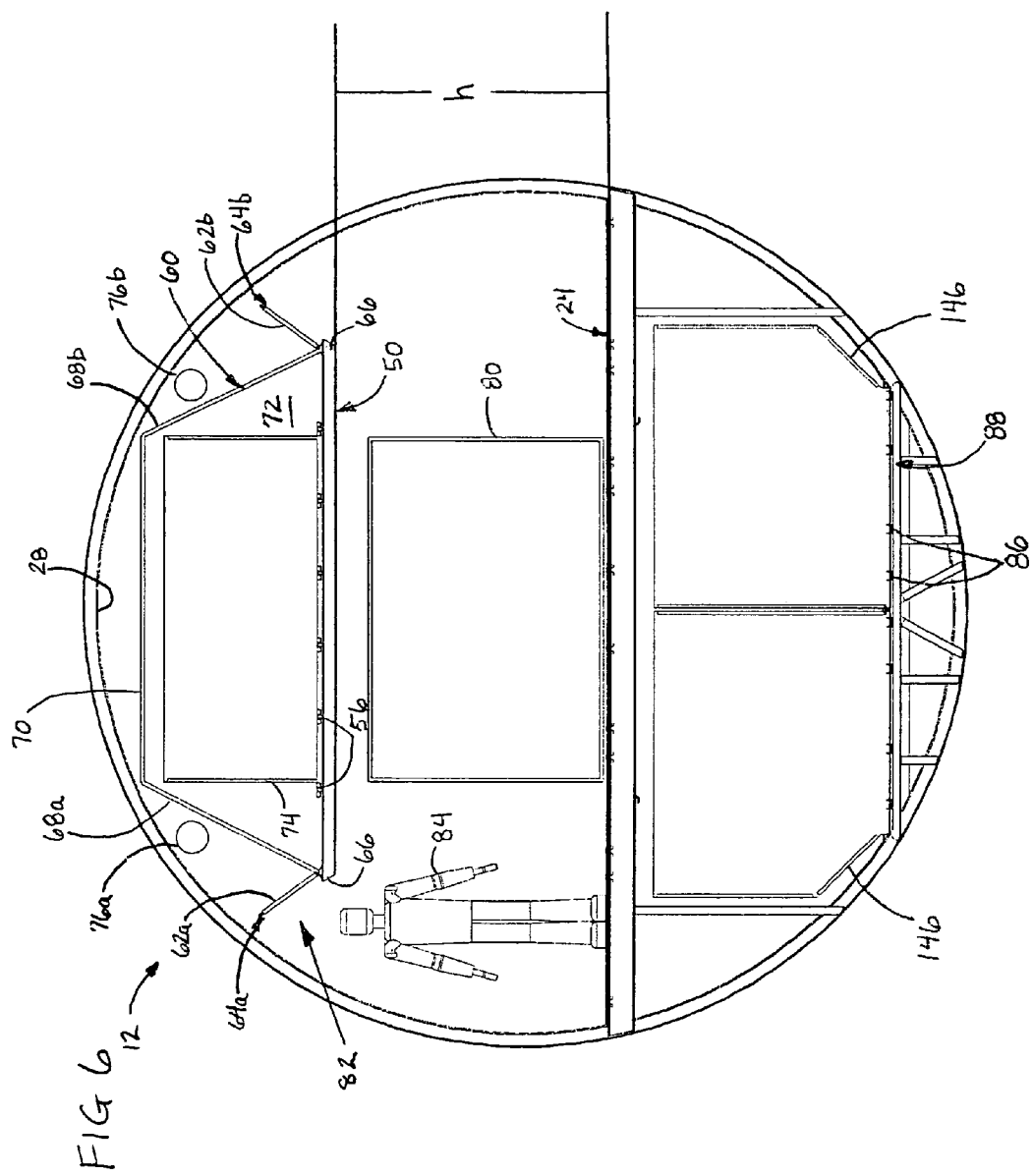

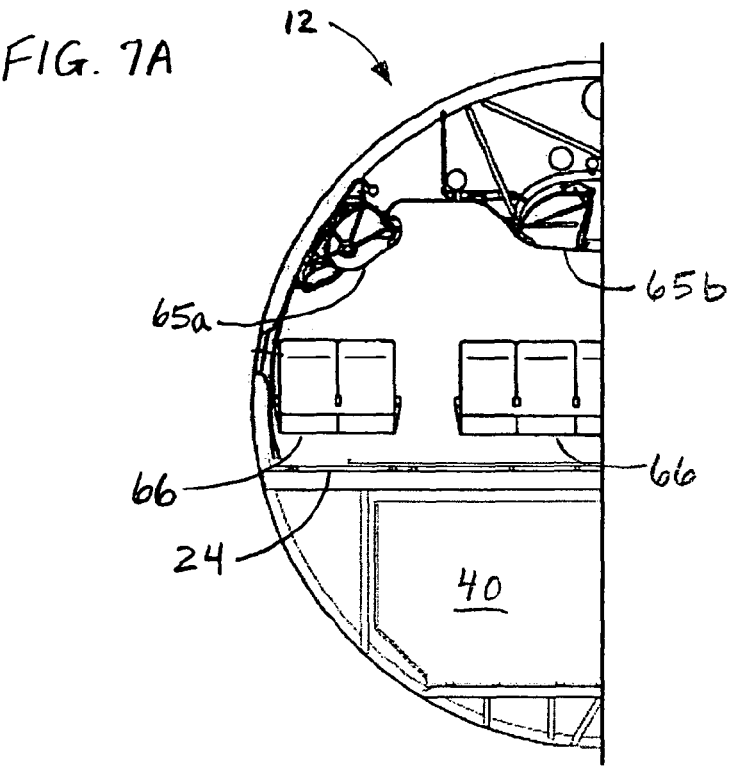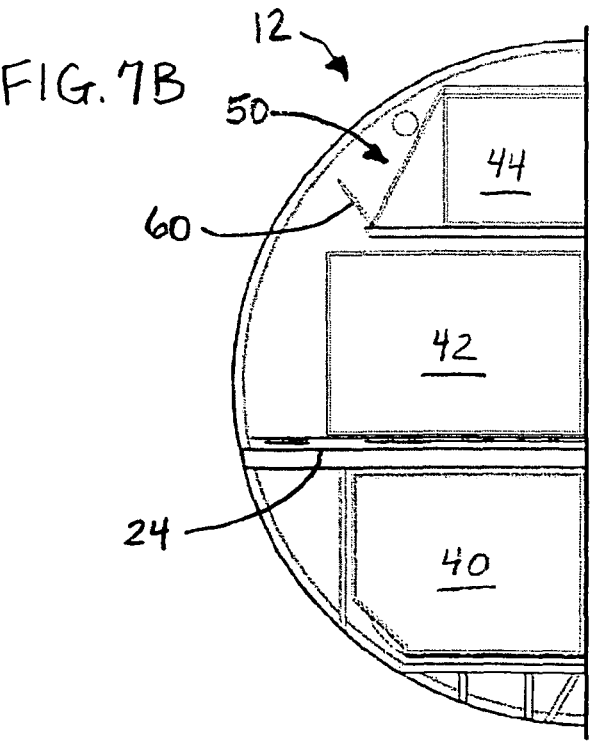

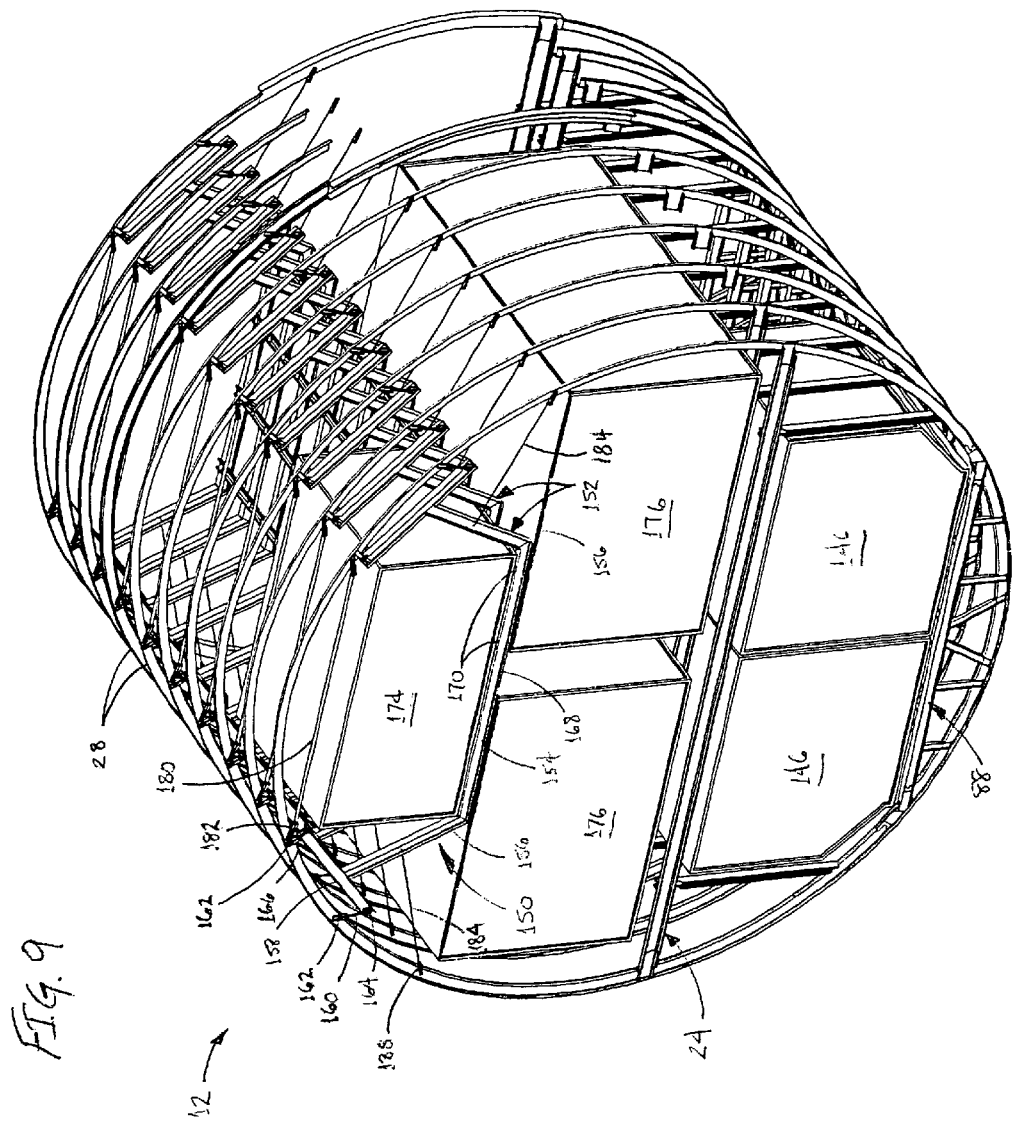

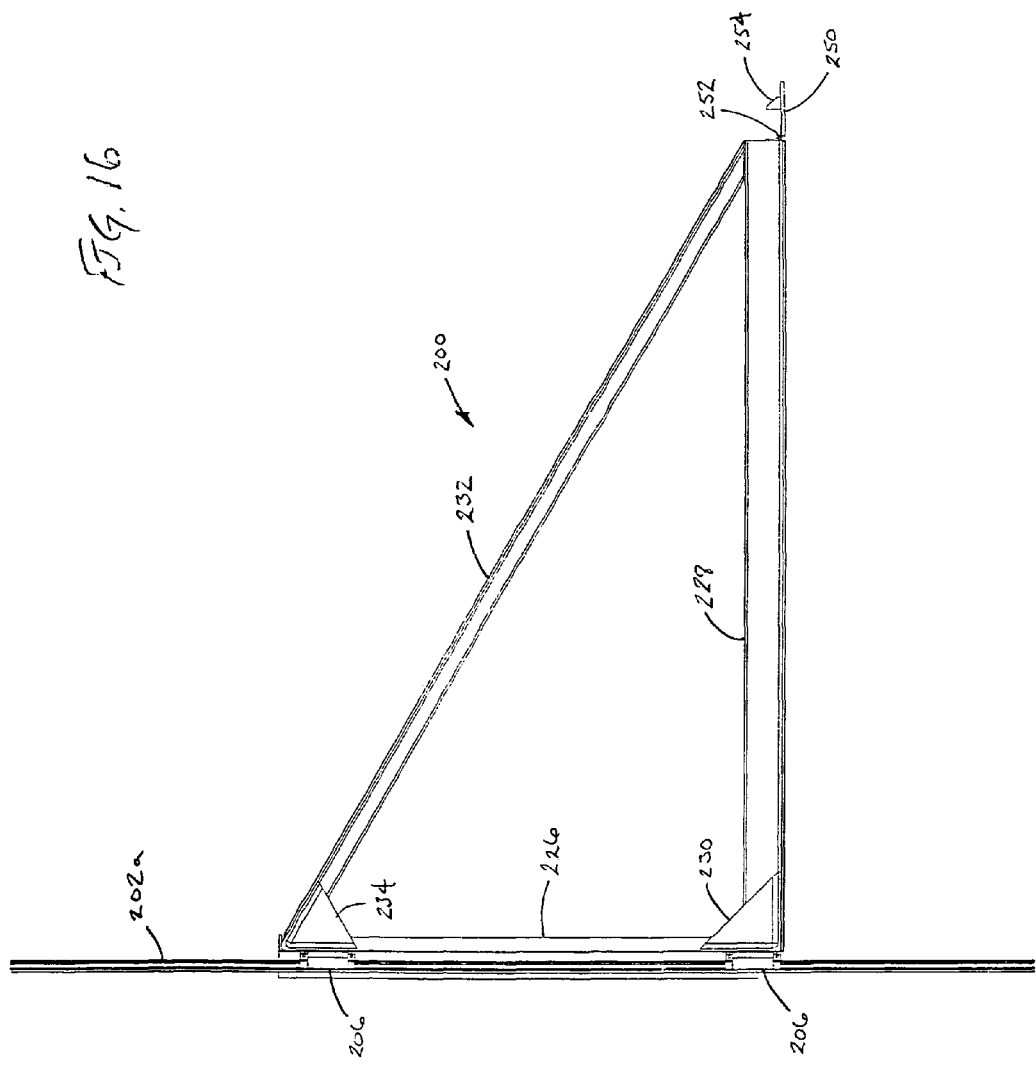

US 8,702,036 B2

SYSTEM FOR OVERHEAD STORAGE OF CARGO CONTAINERS IN UPPER LOBE OF AIRCRAFT

RELATED APPLICATIONS

This application claims the benefit of U.S. Provisional Patent Application Ser. No. 61/455,369 filed on 18 Oct. 2010 and U.S. Provisional Patent Application Ser. No. 61/458,756 filed on 30 Nov. 2010.

BACKGROUND a. Field of the Invention

The present invention relates generally to cargo systems for aircraft, and, more particularly, to a system that enables containerized cargo to be stowed in an upper, generally overhead area of an upper lobe of a fuselage of an aircraft.

b. Related Art

For reasons of economy or flexibility, it is often desirable to convert a passenger aircraft to transport cargo. Conversions may be permanent or temporary/reversible, and moreover may involve the entire aircraft or only a part of it. As a general rule, however, it is desirable that such conversions be economical in nature, and in particular that modifications to the existing air frame and systems be kept to a minimum. Low weight is also a desirable characteristic.

Another important factor is maximum utilization of available space. In this regard, it will be understood that in the case of cargo aircraft, volume rather than weight is often the limiting factor, and so for efficient operation it is therefore generally important to be able to fill as much as possible of the interior volume of the fuselage with cargo.

Achieving the above goals is complicated by certain realities of the aviation industry. First, it will be understood that in modern operations most of the cargo is not packed "bulk" into the fuselage, but instead is first placed into containers that are loaded into the aircraft in a modular fashion. The containers typically have configurations that are standardized (e.g., "LD6"), at least by aircraft type, and generally have a somewhat rectangular geometry, sometimes being angled or "beveled" at one or both lower/outboard edges to better fit within the confines of the cargo holds in the lower lobe.

As another factor, it will be understood that aircraft initially configured for passenger use typically only have hatches capable of receiving such containerized cargo in the lower lobe of the fuselage, with access to the upper lobe/main deck of the aircraft being limited to smaller doors designed primarily for passenger ingress/egress and/or loading of in-flight service items. Adding cargo-loading hatches to the upper lobe of an existing aircraft generally requires modifications that would render such a conversion unattractive from a cost standpoint, and furthermore the ability to return the aircraft to a satisfactory passenger-carrying configuration would be significantly compromised. Moreover, the existing equipment of many airport facilities are designed primary to load cargo through lower lobe hatches, rendering the advantages of upper lobe cargo hatches moot.

One approach towards loading cargo into the upper lobe of an aircraft while meeting the above constraints has been to employ a lift mechanism that moves the containers from the lower lobe to the upper lobe after they have been loaded into the latter, and vice-versa during unloading. A non-limiting example is the lift system that is shown in U.S. Pat. No. 8,011,617, which is incorporated herein by reference. The structural modifications involved in such an approach are mostly limited to the main deck of the aircraft, to provide an opening for the cargo lift, and major changes to the skin and frames of the fuselage are generally avoided.

A remaining problem, however, has been that even after the cargo containers have been loaded onto the upper, main deck of the aircraft, much of the available space remains unfilled. It will be appreciated that in passenger aircraft the main deck, which forms the floor of the passenger compartment, is generally positioned well below the mid-level of the fuselage, to provide adequate space of the passengers and their luggage, as well as for various overhead systems; consequently the height of the underlying cargo compartments is typically much less than that of the passenger compartment. As a result, since the height of the cargo containers is necessarily constrained by the height of the cargo compartments, the containers are insufficiently tall to fill the full height of the passenger compartment when they are moved to the main deck, so that an upper, overhead area of the fuselage remains unfilled. This problem is particularly acute in the case of wide body aircraft such as the Boeing B-777, with the result that a single height row or rows of conventional containers will leave a great portion of the upper lobe unfilled.

Accordingly, there exists a need for a system for carrying cargo in an upper, overhead area of the upper lobe of the fuselage of an aircraft, so as to make efficient use of available volume within the fuselage. Furthermore, there exists a need for such a system that allows the space in the upper portion of the upper lobe to be filled with cargo in modular containers. Still further, there exists a need for such a system in which such containers are loaded into the aircraft through cargo doors providing access to one or more cargo compartments in the lower lobe of the fuselage. Still further, there exists a need for such a system that does not require major modification of existing structures and systems of the aircraft, particularly an aircraft previously configured for passenger-carrying operation. Still further, there exists a need for such a system that facilitates efficient performance of functions by both flight crew and ground service personnel. Still further, there exists a need for such a system that is light in weight, and economical to construct and install.

SUMMARY OF THE INVENTION

The present invention addresses the problems cited above, and provides a system for efficient handling and storage of containerized cargo in an aircraft.

In a first aspect, the system provides an apparatus for carrying cargo in an aircraft, the apparatus comprising a rack assembly mounted in an upper part of a fuselage of the aircraft so as define a cargo space in an upper lobe thereof, and means for supporting a plurality of cargo containers arranged longitudinally on the rack assembly within the cargo area in the upper lobe of the aircraft.

The rack assembly may comprise a plurality of transverse rack frames mounted at intervals to frames of the fuselage of the aircraft. The transverse rack frames may each comprise a lower frame member that extends substantially horizontally to form a lower side of the cargo area in the upper lobe of the aircraft, and first and second suspension frame members that extend generally upwardly from the horizontal frame member towards locations on the frame of the fuselage from which the rack assembly is suspended. The means for supporting the plurality of cargo containers on the rack assembly may comprise at least one cargo rail extending generally longitudinally across the lower frame members of a plurality of the rack frames.

The rack assembly may further comprise means for supporting the upwardly extending suspension beams of the rack frames from pre-existing luggage bin attachment points on the frame of the fuselage. The means for supporting the upwardly extending beam members from the pre-existing luggage bin attachment points may comprise at least one pivotable link member interconnecting an upper end of each of the suspension beam members to one of the pre-existing attachment points on the frames of the fuselage. The at least one pivotable link member may comprise a pivotable link member aligned to transmit loads from the frame of the rack assembly to the frame of the fuselage in a generally radial direction. The geometry of the frames of the rack assembly and the pivotable link members may be configured such that the pre-existing bin attachment points are subjected by the rack assembly to load vectors that are substantially similar to predetermined load vectors for which the frames of the fuselage are rated with storage bins mounted to the pre-existing attachment points.

The frames of the rack assembly may further comprise crossbeam members mounted to the upper ends of the suspension beam members and having upper and lower ends, the upper and lower ends of the crossbeam members being attached by the pivotable link members to the pre-existing attachment points on the frame member of the fuselage.

The apparatus may further comprise at least one rigid bar mounted transversely across an upper end of the frame of the fuselage above the storage area of the rack assembly to hold the frame against bowing inwardly under loads exerted by the rack assembly, and at least one tension cable interconnecting each of the upwardly extending suspension beam members to the frame of the fuselage so as to hold the frame from bowing outwardly under loads exerted by the rack assembly.

The rack assembly may extend substantially a full length of the main fuselage section of the aircraft.

In another aspect, the invention provides a lift apparatus for raising and lowering cargo containers between a main deck of an aircraft and a storage area in an upper lobe of a fuselage of the aircraft, comprising broadly a lift platform for supporting cargo thereon, a lift mechanism for selectively raising and lowering the lift platform between the main deck of the aircraft and the storage area in the upper lobe of the fuselage, and a transverse barrier in the fuselage having the lift mechanism mounted thereto so that loads exerted by the lift platform on the lift mechanism are supported by the barrier structure.

The lift mechanism may comprise a generally vertically aligned ball screw assembly having the lift platform lifted to a traveling nut portion thereof. In another embodiment, the lift mechanism may comprise a telescopic hydraulic cylinder having the lift platform mounted to an upper end portion thereof. Substantially an entirety of the lift mechanism may be housed within the transverse barrier structure.

The lift apparatus may further comprise at least one linear guide mounted to the transverse barrier structure that stabilizes the lift platform as the lift platform is raised and lowered by the lift mechanism.

The lift platform of the lift apparatus may comprise a plurality of deck members that nest between longitudinally extending fixed cargo tracks on the main deck of the aircraft when the lift platform is in the lowered position, the deck segments being substantially level with the fixed cargo tracks when the lift platform is in the lowered position so that cargo is able to transition horizontally between the fixed rails and the lift platform of the lift apparatus. The plurality of deck segments of the lift platform may comprise substantially horizontal deck segments having cargo rollers mounted thereon. In another embodiment, the deck segments of the lift platform may comprise a plurality of substantially horizontal tine members.

The transverse barrier structure to which the lift mechanism is mounted may comprise a protective barrier installed between a personnel area and a cargo area of the aircraft.

In another aspect, the invention provides a cover apparatus for closing a cargo opening in a deck of an aircraft, the cover apparatus comprising a plurality of substantially horizontal plate members, and guide mechanisms supporting longitudinal edges of the plate members from portions of seat tracks depending below said main deck so that the plate members are selectively extensible across said cargo opening.

The guide mechanisms may comprise linear guides mounting the edges of the plate members to the depending portions of the seat tracks.

The plurality of plate members of the cover apparatus may comprise first and second sets of plate members that are selectively extensible from opposite sides of the opening so as to meet proximate a middle area thereof. The cover apparatus may further comprise cooperating channel and tongue members mounted on opposing distal ends of the first and second sets of plate members, that meet to form a tongue-and-groove engagement that supports extended ends of the plate members proximate the middle area of the opening.

These and other features and advantages of the present invention will be more fully appreciated from a reading of the following detailed description with reference to the accompanying drawings.

BRIEF DESCRIPTION OF THE DRAWINGS

FIG. 2 is an enlarged perspective view of the main fuselage section of the aircraft of FIG. 1, with the skin of the fuselage removed for clarity, showing the positioning the upper lobe cargo system and also the arrangement of containerized cargo within the fuselage;

FIG. 3 is a perspective, longitudinal cross-sectional view of the aircraft fuselage of FIG. 2, without the cargo containers loaded therein, showing the arrangement of the decks and the cargo handling system therein in greater detail;

FIG. 4 is a perspective, transverse cross-sectional view of a segment of the fuselage section of FIGS. 2-3, showing an exemplary cargo container loaded on the upper lobe cargo rack of the system of the present invention;

FIG. 5 is a second cross-sectional perspective view of the fuselage segment of FIG. 4, showing a second container positioned on the lower cargo deck in register with the opening in the main deck through which containers are raised/lowered from/to the lower level;

FIG. 6 is a transverse cross-sectional view of the fuselage segment of FIGS. 4-5, showing the relationship of the upper lobe cargo rack of the present invention and its supporting framework to the other decks and to the structure of the fuselage in greater detail, and also showing exemplary containers loaded on all three levels;

FIGS. 7A-7B are corresponding, comparative half-cross-sectional views of the aircraft fuselage of FIG. 1 in the original passenger-service configuration and after installation of the cargo system of the present invention, respectively, showing the manner in which pre-existing structure and attachment points of the fuselage are employed for installation of the cargo system;

FIG. 9 is a cutaway perspective view of the fuselage section of FIG. 8, showing the structure of the upper lobe cargo rack thereof in greater detail;

FIG. 10 is a cutaway plan view of the forward section of the aircraft of FIG. 1, showing an exemplary barrier that is installed between the cargo area and the main fuselage section and the control and supernumerary spaces in the nose section of the aircraft;

DETAILED DESCRIPTION

Figure 1:
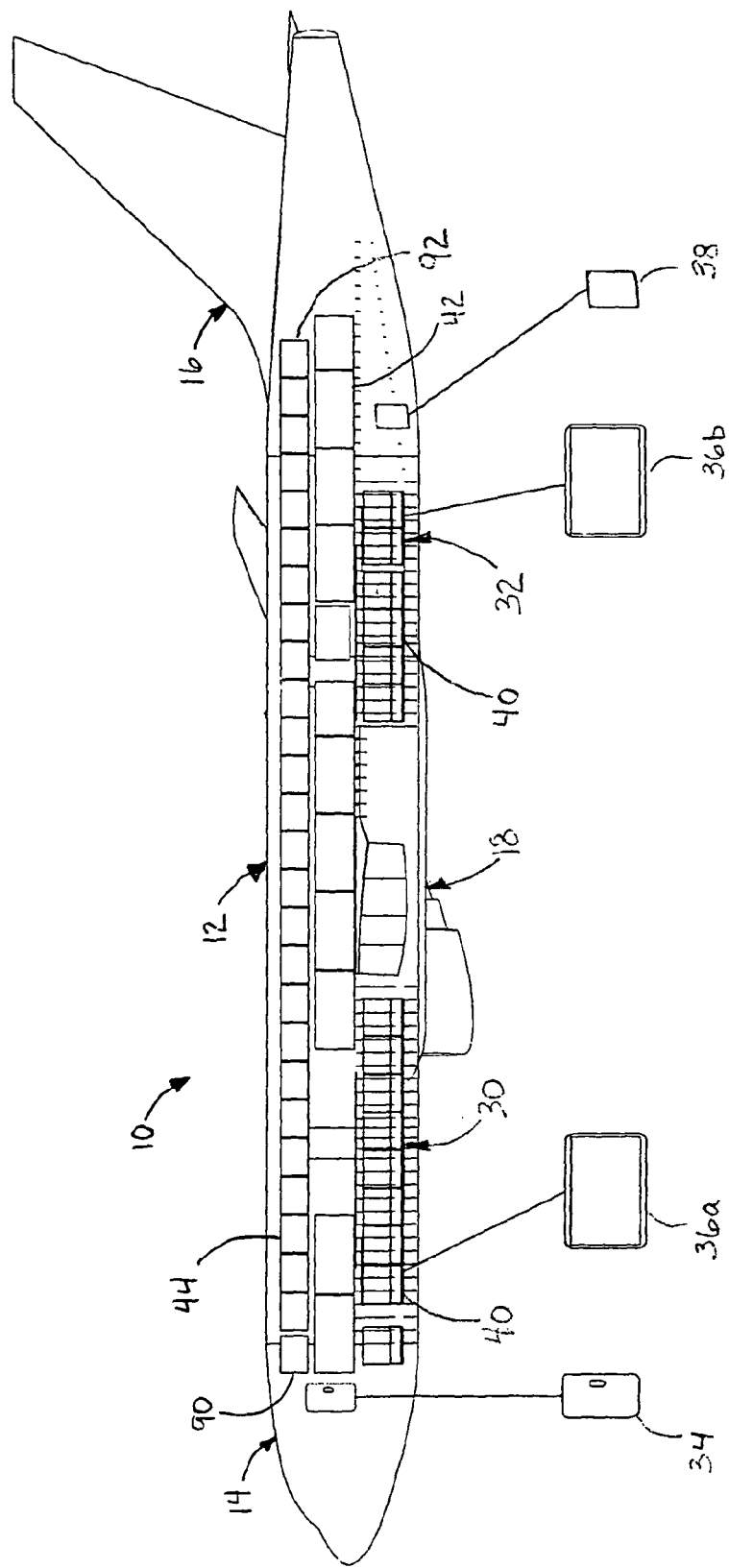
FIG. 1 is a side elevation view, partly in cutaway, of an exemplary aircraft having an upper lobe cargo system in accordance with the present invention installed therein.

FIG. 1 shows an exemplary aircraft 10 having an upper lobe cargo system in accordance with the present invention installed therein. The example shows a wide body aircraft originally configured for passenger service, specifically a Boeing B-777, however it will be understood that the system may be installed in other suitable models and types of aircraft. As is conventional, the aircraft includes a main fuselage section 12, with a nose section 14 housing control and supernumerary spaces at the forward end, an empennage section 16 at the aft end, and a wing section 18 at an intermediate location.

As can be seen with further reference to FIG. 1, and also FIG. 2, the main fuselage section 12 includes an upper lobe 20 and lower lobe 22, separated by the generally horizontal main deck 24. For structural and operational reasons, the main fuselage section is typically more-or-less cylindrical in shape over most of its length, the lower lobe being interrupted by a wing box 26 to form forward and aft cargo holds 30, 32; conventionally, the main shell of the fuselage section is formed by a series of more-or-less circular, rib-like frames or formers over which the skin is mounted, the skin not being shown in FIG. 2. The upper lobe, in turn, typically extends substantially the full length of the main fuselage section, and forms the main passenger compartment in aircraft that are configured for passenger service. Consequently, as was discussed above and as can be seen in FIG. 1, access to the upper lobe is typically via one or more comparatively small passenger doors 34, while the fore and aft cargo areas are provided with large cargo hatches 36a, 36b that are able to accommodate containers far larger than could pass through the passenger door or doors 34. The lower lobe may also include a smaller bulk cargo door 38, in the area of the lower lobe rearward of the aft containerized cargo compartment.

Thus, standardized cargo containers 39 can be loaded into the lower holds 30, 32 through hatches 36a, 36b in one or more rows, as indicated at 40 in FIG. 1. A lift conversion, such as that noted above, allows the containers to then be moved from the lower deck or decks of the cargo areas to the main deck 24 of the former passenger area in one or more rows, as indicated at 42 in FIG. 1. Loading containers up to the main deck 24 alone, however, leaves the uppermost (overhead) portion of the upper lobe unfilled: For example, in an exemplary Boeing B-777 aircraft, some 18-20% of the total volume of the main fuselage section may thus remain unfilled. The present invention provides a system that enables this space to be largely filled with additional containerized cargo, thus greatly enhancing efficiency.

As can be seen in FIG. 2 and also FIGS. 3-6, the system of the present invention provides a suspended rack 50 that is installed to form a third level in the main fuselage section, on which additional cargo containers can be placed in one or more rows so as to fill the top portion of the upper lobe, as indicated at 44 in FIG. 1. As can be seen in FIG. 4, the rack 50 is suitably constructed of a series of transverse beams 54 and longitudinal rails or tracks 56 underlain by a lightweight horizontal panel 52. The rack 50 is supported by a trusswork 60, that is preferably constructed of a series of lightweight rods, preferably arranged so as to carry axial loads only. Upwardly and outwardly angled suspension rods 62 are mounted to brackets 63 at the outer sides or edges of rack 50, with the outer (distal) ends of the rods in turn being mounted to pre-existing attachment fittings 64 formed on frames 28 for supporting overhead stowage bins when the aircraft is in a passenger configuration, the stowage bins having been removed prior to installation of the overhead cargo system of the present invention. The angular relationship of the suspension rods and other geometry of the trusswork 60 is selected to maintain substantially the same load vectors on the frames 28, through attachment point 64, as that for which the frames were originally rated with the overhead stowage bins installed. As can be seen in FIGS. 7A-7B, which are comparative views of a fuselage section 12 "before-and-after" installation of the cargo system of the present invention, the trusswork 60 supporting the overhead rack 50 mounts to attachment points 64 that formerly supported the side and centerline overhead storage bins 65a, 65b, the storage bins having been removed for the conversion along with the passenger seating 66. Hence, the trusswork frame 60 enables the raised rack 50 to be installed and used with the pre-existing frames and attachment fittings, greatly enhancing the overall economy of the installation.

As can be seen with further reference to FIG. 6, the trusswork 60 further includes side rods 68 that extend upwardly from attachment brackets 66 at inward and upward angles to the suspension rods 62. The upper ends of the side rods terminate closely adjacent the inside surface of the fuselage section, proximate the inner edges of the fuselage frames 28, where they may be mounted to additional pre-existing bin attachment fittings, and where they are connected to a horizontal upper rod 70 that extends parallel to rack 50 and that spans the top of the trusswork frame 60. The side and upper rods 68 and 70 thus cooperate with rack 50 to form a framework having a generally quadrilateral cross-section and an open interior passage 72. The horizontal lower panel 52, in turn, acts as a shear panel to transfer fore-aft loads to the sides of the suspended rack, where fore/aft aligned diagonal rods react the loads to the fuselage shell, and also serves as a drip shield to channel liquid into drains that run to the belly of the aircraft.

As can be seen in FIG. 6 and also FIGS. 4-5, the interior passage 72 defined by the quadrilateral framework is dimensioned to be able to receive a standardized cargo container 74 of predetermined size. In particular, the height between the rack 50 and top bar 70 is designed to be just slightly higher than the predetermined height of the containers 74, while the lateral spacing between the upper ends of the side rods 68 as defined by top rod 70, is selected to be just slightly greater than the predetermined width of the containers, with sufficient clearance to allow the containers to move longitudinally through the spaces 72. Since the corners between the side rods 68a, 68b and top rods 70 are themselves located closely adjacent the top inside surface of the fuselage, the framework and deck hold the containers essentially as high in the upper lobe of the fuselage as is possible given the width of the containers; the lower side of the rack 50, in turn, is positioned a height "h" (see FIG. 6) above the main deck 24 that is sufficient to accommodate one or more rows of standardized containers 80, sized for example to fit within the height of the underlying cargo compartments. During flight the containers are restrained by stops arid/or other fittings attached to the longitudinal and/or lateral members 54, 56 of the suspended rack.

A further advantage of the generally quadrilateral cross-section of the trusswork frame 60 is to allow the system to be installed while leaving clearance for preexisting or re-routed ventilation ducts 76a, 76b and other lines that are typically installed in the upper sides of the fuselage section. Still further, the angle of the suspension rods 62, upwardly and outwardly from the edges of rack 50, provides overhead clearance at the outboard sides of the suspended rack 50, as indicated at 82 in FIG. 6, thus allowing personnel 84 to walk the full length of main deck 24 without having to stoop or hunch over.

Figure 8:
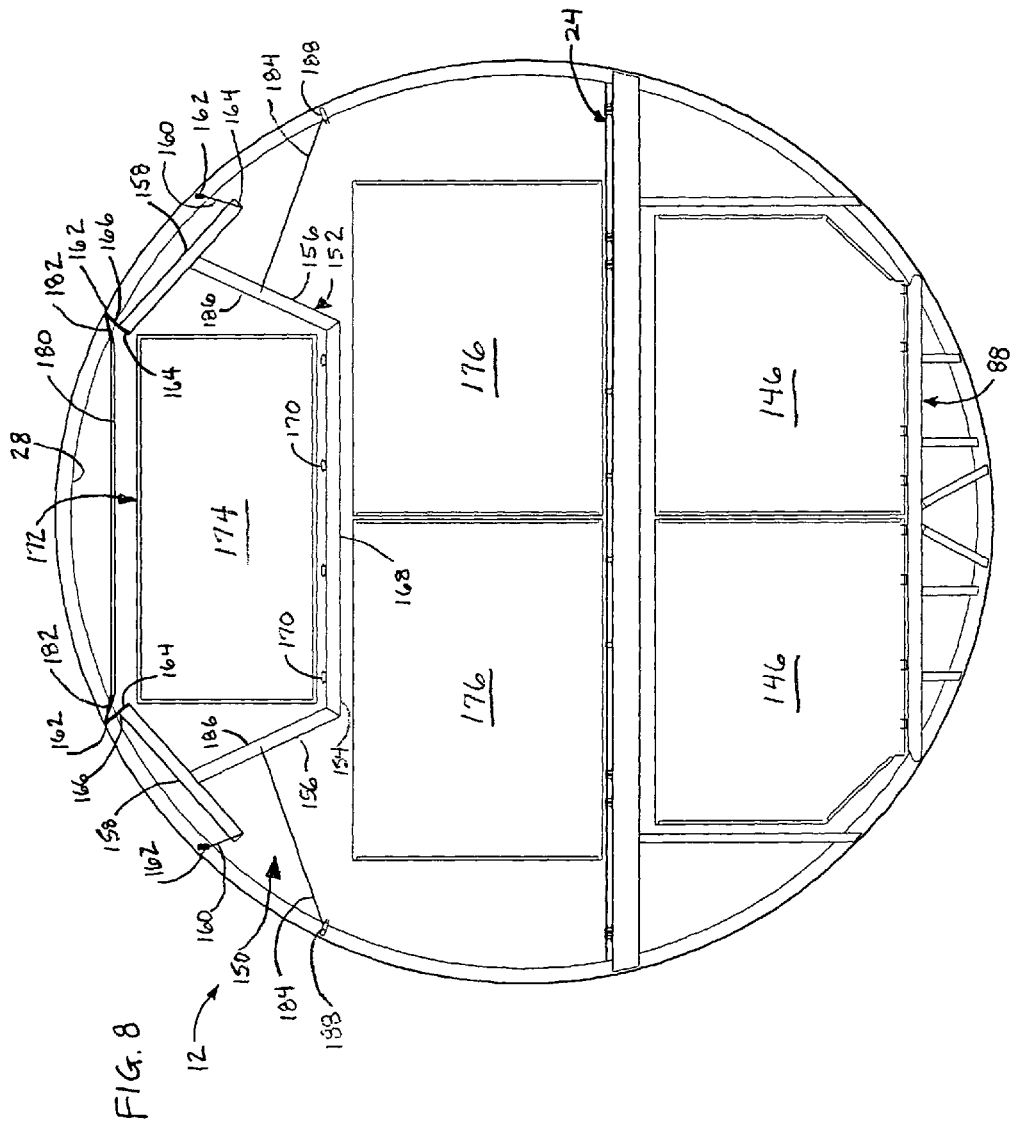
FIG. 8 is a transverse cross-sectional view of the fuselage segment as in FIGS. 4-5, showing an upper load cargo rack in accordance with another embodiment of the present invention.

FIGS. 8-9 illustrate an upper lobe suspended rack assembly 150 in accordance with another embodiment of the present invention. As can be seen, the storage area formed by the rack is somewhat similar in cross-section to that of the embodiment illustrated in FIGS. 4-7 and similarly positions the containers close to the crown of the fuselage, however, the structure and the manner in which loads are distributed into the fuselage are somewhat different in the embodiment shown in FIGS. 8-9.

As can be seen in FIGS. 8-9, the rack assembly 50 is constructed of a series of somewhat U-shaped frames 152, preferably mounted at each fuselage frame 28 over the length of the fuselage in which the rack assembly is installed. Each rack frame 152 includes a crossbeam 154 that extends horizontally across the fuselage when the frame is installed, with a suspension beam 156 extending at an upward and outward angle (e.g., approximately 70° to horizontal) at each end. Spreader or crossbeams 158 are in turn mounted to the upper, outboard ends of the upwardly extending suspension beams, in a somewhat T-shaped configuration. The angle in which the spreader beams 158 are mounted to the suspension beams is selected such that the two ends of the spreader beams extend upwardly-inwardly and downwardly-outwardly from the suspension beams to locations that are positioned generally proximate each fuselage frame 28; in the preferred embodiment that is illustrated, the upper ends of the spreader beams extend at an upward and inward angle of about 120° to the suspension beams, while the lower ends extend at a downward and outward angle of about 60°. It will be understood that angles may vary somewhat depending on rack size, fuselage configuration, attachment point locations and other design factors, and that the foregoing angles are therefore given by way of example rather than limitation.

The two ends of each spreader beam 158 are connected to the same frame 28 on opposite sides of the fuselage, preferably utilizing pre-existing overhead bin attachment points as discussed above. The outboard/lower ends of the spreader beams are supported from the frame 28 by relatively short rod members 160 having yokes 162 at their upper ends that are pivotably pinned to the fuselage frame, and brackets 164 at their lower ends that are pivotably connected to the ends of the spreader beams. The spreader beams and connection points are preferably dimensioned and located so that the lower/outer rods 160 are aligned generally vertically as shown in FIG. 8 and therefore loaded primarily in tension to support the weight of the rack and the cargo carried thereon. The upper/inboard ends of the spreader beams are similarly connected to attachment points on the fuselage frame 28 by means of comparatively short rod members 166 pivotably mounted to the frame and the beam ends by yokes 162 and brackets 164, but preferably at a more inwardly directed angle (e.g., approximately 45°) to both support the rack/cargo and stabilize it against lateral movement. The angles of the rods and their locations also serve to mimic the types and directions of loads exerted by the overhead bins for which the attachment points were originally selected and engineered, facilitating both engineering and load calculations for the rack assembly and also potentially simplifying certification issues.

The beam members 154, 156, 158, which are suitably formed of aluminum alloy, fiber composite or other material having suitable strength and weight characteristics, and that are joined by fasteners, welding, adhesives, co-molding or other means suitable to the material, thus form rigid frame elements 152 that are suspended from the fuselage frames from the rod members 160, 166. As can be seen in FIG. 9, a series of the frame members 152 are mounted in a substantially identical manner to the fuselage frames 28 over a length of the fuselage in which the upper lobe cargo rack is installed. In the embodiment that is illustrated, the rack frames 152 are mounted at each fuselage frame 28 over the length of the installation, enhancing the strength and load carrying capacity of the rack system; in those instances where the fuselage being converted does not include pre-existing mounting points for overhead bins at each frame 28 (e.g., where the mounting points are provided at every other frame), corresponding attachment points can be formed on the intermediate frames using a jig or other suitable mechanism. Similar to the embodiment described above, a panel or series of panels 168 is mounted to the lower, horizontal beam members 154 of the frames over the length of the rack to form an integrated assembly, both for purposes of rigidity and strength and to prevent excessive fore-aft movement of the assembly. Longitudinal roller tracks 170 are in turn installed over the tops of the horizontal beams 154 to support movement of containers thereover in a manner also similar to the embodiment described above.

Installed in the manner described above, the rack assembly thus forms an upper lobe cargo area 172 that supports the load of cargo containers 174 at a level above the containers 176 on the main deck 24 of the aircraft. Thus, similar to the embodiment described above, the rack system 150 greatly improves utilization of volume available within the fuselage.

It has been found that the loadings made possible by the rack assembly may in some instances have the potential to create deformation or "bowing" of the upper fuselage under some circumstances. In particular, application of the inward/downward loads of the loaded rack assembly to the upper sides of the fuselage may potentially cause the frames 28 and surrounding shell of the fuselage to bend inwardly somewhat at the sides and bulge upwardly somewhat at the crown.

In order to obviate the foregoing possibility, the rack installation 150 further includes a series of rigid, fixed length spanner bars 180 that are mounted horizontally across the fuselage frames 28 using links 182, above the upper load cargo space 172 formed by the rack assembly, and preferably in accompaniment with each rack frame 152. Cables 184 in turn extend at outward and downward angles from the approximate midpoints 186 of the suspension beams 156 of the rack frames 152, to links 188 mounted lower down on the sides of the fuselage but still high enough to provide clearance for the containers 176 on the main deck 24. With links 182 and 188 suitably adjusted, the spanner bar resists inner loads on the fuselage frame 28 in compression while the cables 184 resist outward loads in tension, thus maintaining the generally circular form of the frames 28 and thereby avoiding inward/outward bowing of the upper fuselage due to the loads carried on the upper lobe rack.

In order to raise containers 74 from main deck 24 to the suspended rack 50, forward and aft lift assemblies 90, 92 are located at opposite ends of the fuselage section 12. As can be better seen in FIGS. 11 and 13, each of the lift mechanisms 90, 92 in the embodiment illustrated therein includes a lift fork assembly 94 made up of a series of projecting, longitudinally extending tines 96 supported on a triangular frame constructed of a horizontal bar 98, a vertical center post 100, and angled bars 102a, 102b that connect the ends of the main horizontal bar 98 to the top of the center post 100. The forks 94 are sized to fit under the containers 74 over substantially all or most of the length thereof, while the framework 94 provides rigidity and support to the tines while raising/lowering the containers.

Figure 11:
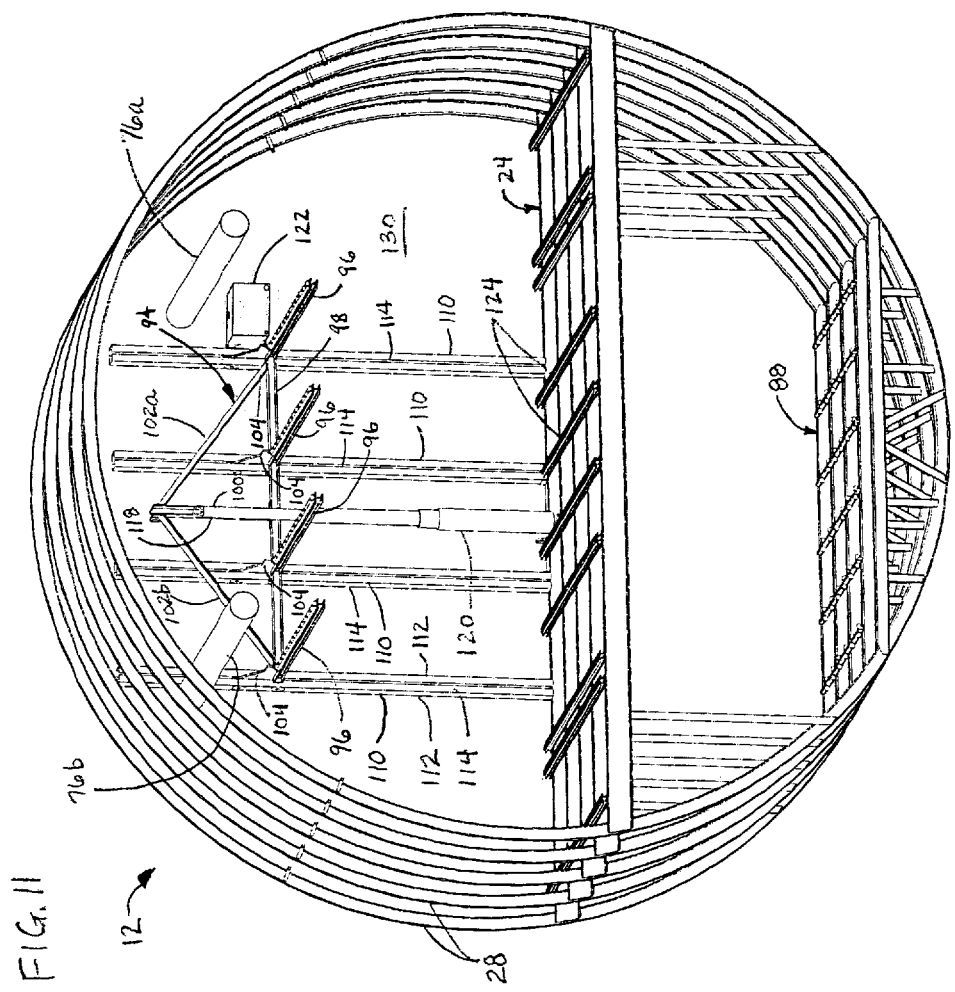
FIG. 11 is a perspective, cross-sectional view of a segment of the main fuselage section of the aircraft of FIG. 1, looking towards the forward end of the aircraft, showing the aft side of the barrier shown in FIG. 10 and also the lift apparatus of the upper lobe cargo system that is mounted thereto.
Figure 13:
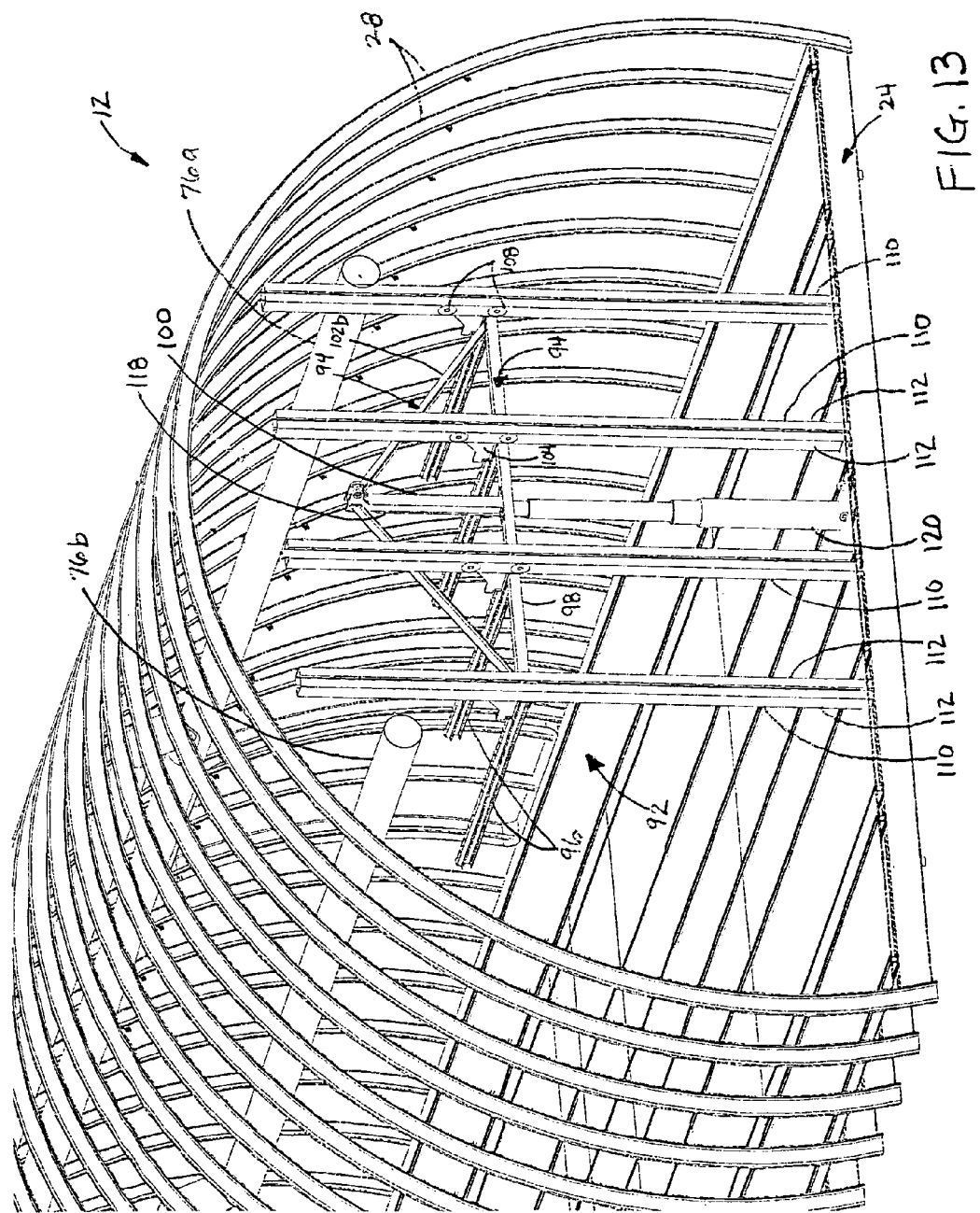
FIG. 13 is a perspective, cross-sectional view of a segment of the main fuselage section of the aircraft of FIG. 1, at an aft end thereof and looking towards the forward end of the aircraft, showing a second lift mechanism of the upper lobe cargo system of the present invention that is mounted at an aft end of the upper lobe cargo deck for raising/lowering containers to and from the suspended upper rack.

As can be seen with further reference to FIGS. 11 and 13, an upwardly gusseted bracket 104 is mounted at the base end of each of the fork tines 96. Paired rollers 108 (shown in phantom in FIG. 13) are mounted on the ends of brackets 104 opposite the tines and are captured for vertical rolling movement in stanchions 110, each of the stanchions being formed by a pair of parallel, inwardly facing C-section channel members 112 that are sized to receive rollers 108 in rolling engagement therewith. The adjoining channel members of each stanchion are spaced apart slightly to form a slot 114 sized to accommodate the cooperating bracket 104, so as to permit the latter to move freely along the stanchion while retaining the paired rollers therein.

The stanchions 110 thus provide support for the fork assembly 94 of each lift mechanism, while allowing the fork assembly to move in upward and downward directions. The center post 100 of the fork assembly, in turn, is mounted to the upper segment 118 of a telescopic hydraulic cylinder 120, the lower end of which is mounted to the main deck 24 of the fuselage. Hydraulic power is supplied to the telescopic cylinder by a motor (not shown) and fluid reservoir 122, to selectively move the fork assembly between a lowered position in which the tines 96 are substantially level with tracks 124 in main deck 24 (where they nest between existing roller trays) and a raised position in which the tines are substantially level with corresponding tracks 56 in the suspended rack 50, the tines including roller and the ends of the tines preferably being beveled somewhat to ease in transitioning containers between the rails and the tines.

As can be seen with further reference to FIG. 11 and also FIG. 10, the forward lift mechanism 90, and in particular the stanchions 110 thereof, are preferably mounted to the aft side of a bulkhead structure 130 that is mounted at the forward end of fuselage section 12, proximate the juncture between it and the nose section 14: The bulkhead 130, which may be of a type referred to as "9G Bulkhead," is manditorily installed in aircraft configured for cargo transport operations, and is intended to protect the control and supernumerary spaces 132, 134 in the nose section from cargo shifting forward in the event of a hard landing or other accident. Bulkhead 130 is therefore usually a relatively sturdy structure, and utilizing it as an attachment/support for the forward lift mechanism enhances both structural and space efficiency. Furthermore, as can also be seen in FIG. 10, the bulkhead 130 may include doorways 136a, 136b that communicate with the cargo compartment in the main fuselage section, through which personnel may enter to walk on either side of the cargo in the manner shown in FIG. 6.

Accordingly, to fully load the aircraft with containers, as shown in FIG. 1, the first containers 74 are loaded into the forward and/or rearward cargo holds 30, 32, through hatches 36a, 36b, and moved along rails 86 over the lower deck 88 into position beneath one or more lift openings 140 in the main deck 24, as shown in FIG. 5. The lift mechanism at opening 90 may suitably be of the kind which is disclosed in the above-identified copending application, although it will be understood that other forms of lift mechanisms may be used. In the illustrated embodiment the lift deck selectively moves between the level of the lower cargo deck 88 and main deck 24, and is stowed in the raised position with the deck 142 (see FIG. 3) being latched to cooperating structures 144 at the edges of the opening.

Thus, during loading, the lower deck lift mechanism raises the containers from the cargo compartment or compartments 30, 32 to the main deck 24, over which the containers are then moved along cooperating rails 124 until positioned over the tines 96 of the fork assembly of the forward and/or aft lift assembly 90, 92. The containers are then raised until level with the suspended rack assembly, and then transitioned off of the fork tines and onto the rails 56 of the suspended deck, over which they are moved longitudinally so as to fill the suspended deck to the extent desired with the upper row 44 of containers. Subsequently or simultaneously, additional containers are fed into the cargo holds and lifted to the main deck through openings 140 by the lower lift mechanism, so as to fill to the desired extent the main deck with the middle row 42 of containers. Additional containers 146 are then loaded into one or both of the lower cargo compartments and moved along rails 86 into position to fill the compartments to the extent desired with the lowermost rows 40 of containers, so that ultimately substantially all of the available volume in the fuselage section is filled with containers. Unloading can be performed in a substantially reverse sequence.

Figure 12:
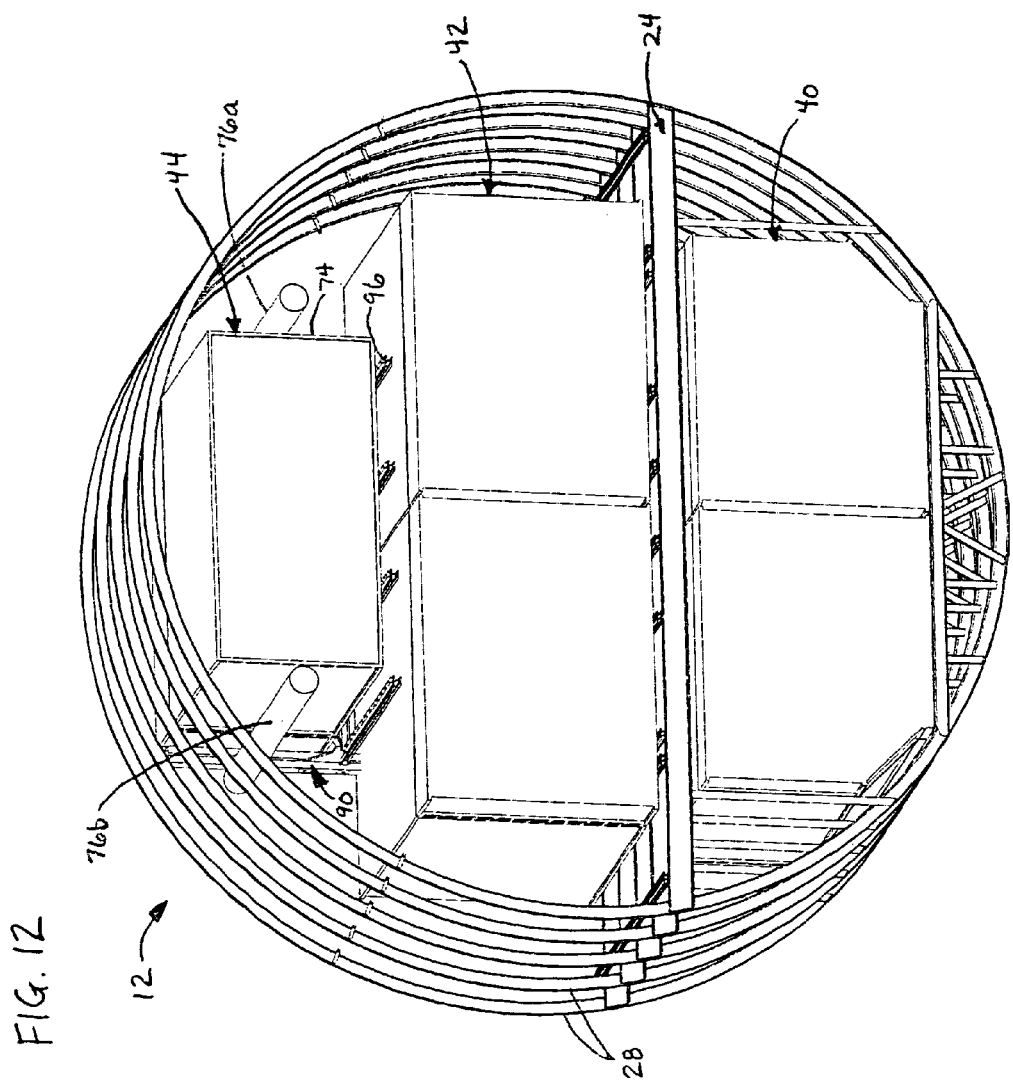
FIG. 12 is a second perspective, cross-sectional view of the fuselage segment of FIG. 9, showing the positioning of containers on and below the lift apparatus of the upper lobe cargo system shown in FIG. 11.

FIGS. 14-19 illustrate a lift apparatus 190 in accordance with another embodiment of the present invention, that serves to raise/lower cargo to/from the upper lobe storage area similar to the embodiment shown in FIGS. 11-12, and which among other aspects features further incorporation of the mechanism into the adjoining bulkhead, e.g., the 9G Bulkhead separating the cargo and controls/supernumerary spaces. As noted above, a 9G Bulkhead (or equivalent) is required in cargo conversions in general, consequently incorporating the lift apparatus into the bulkhead so that the bulkhead serves both as a barrier and as a combined enclosure and support for the lift mechanism represents a significant savings in terms of weight and space. It will be understood that the term "9G Barrier" as used in this description and the appended claims includes all such barriers installed between cargo and personnel spaces, whether rated for "9G" loads or a higher or lower specifications.

Figure 14:
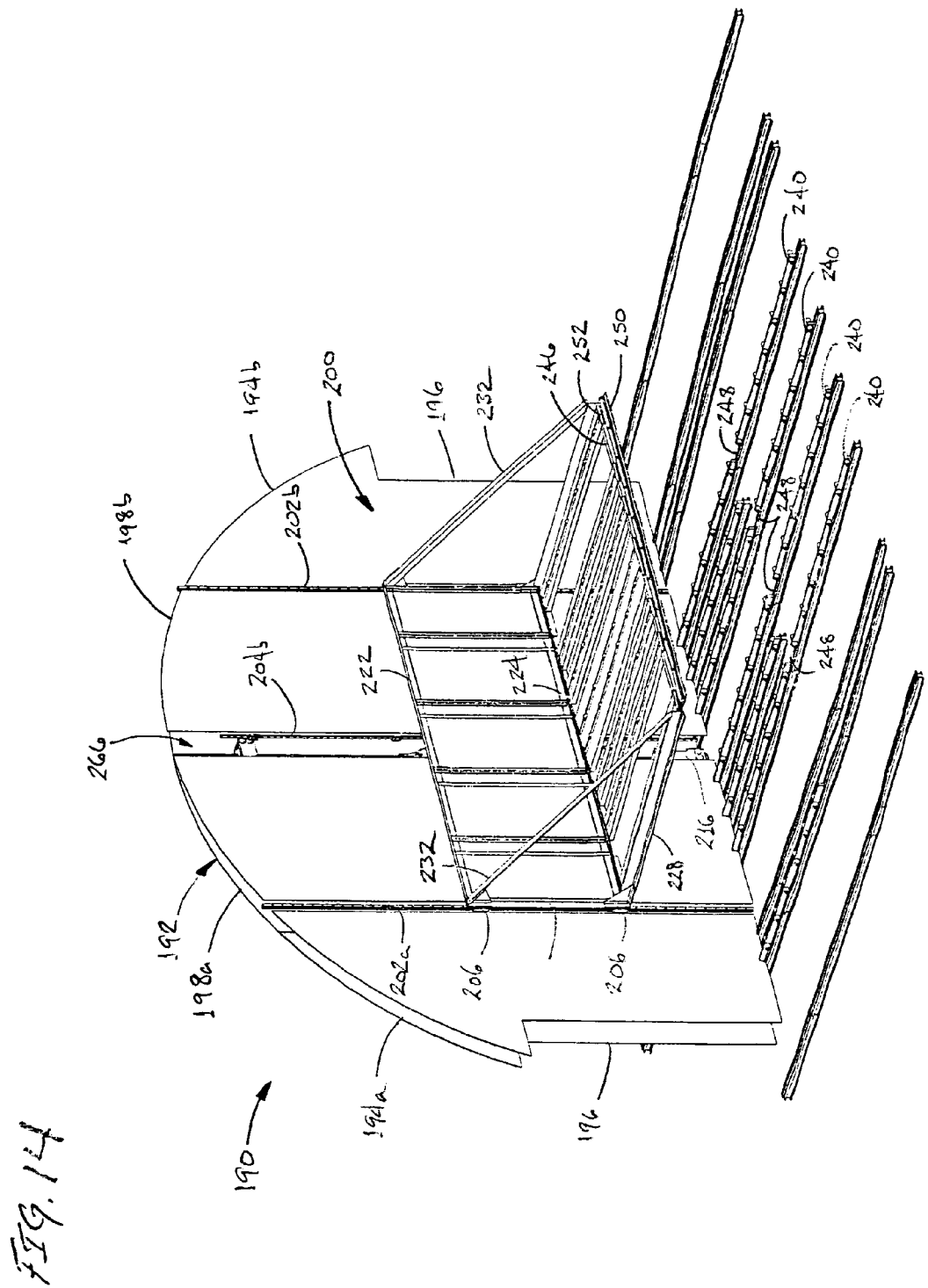
FIG. 14 is a perspective view, similar to FIG. 11, of a fuselage barrier incorporating a lift apparatus in accordance with a second embodiment of the present invention.

As can be seen in FIG. 14, the barrier 192 of the illustrated embodiment is constructed in four sections, namely, a pair of upward sections 194a, 194b, suitably including cutout areas 196 for doors/personnel passages, and inboard sections 198a, 198b that meet generally at the centerline of the fuselage. By constructing the barrier in four sections as shown, it is possible to size the sections to fit through existing openings in a passenger configured aircraft, either through the passenger/service access doors of the main deck or through the cargo doors of the lower deck, thus greatly facilitating installation.

Figure 15:
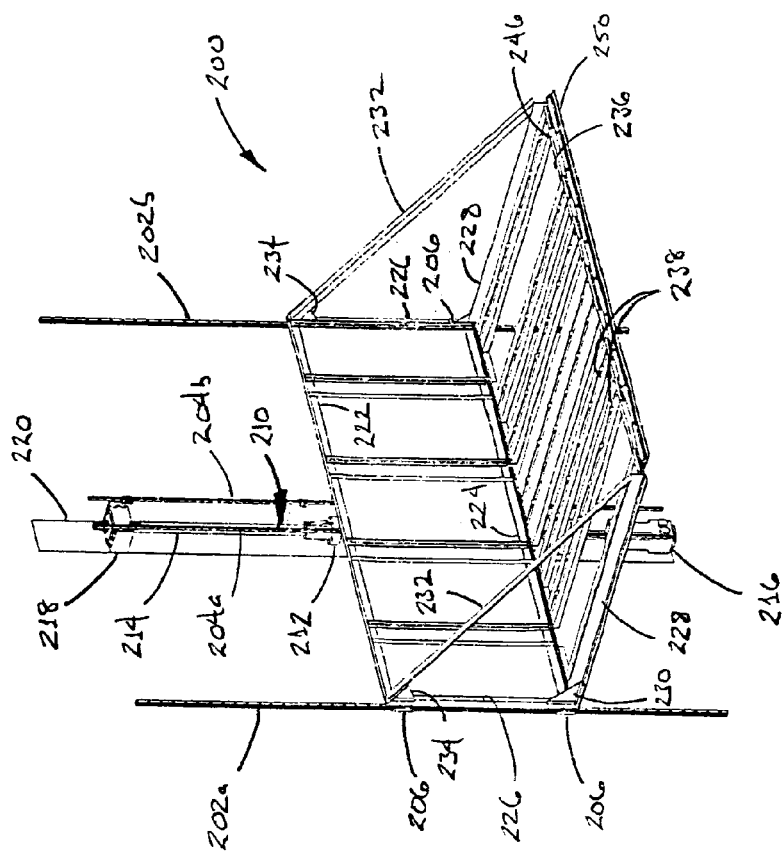
FIG. 15 is a perspective view of the lift apparatus of FIG. 14, separated from the barrier structure for purposes of illustration.

The lift apparatus 190 includes a series of upright supports/guides that are mounted at the vertical junctions between the sections of barrier 192. As can be seen in FIG. 15, which shows the lift mechanism with the sections of the barrier removed, the vertical guides/supports are formed by a series of linear guide rods, a first set 202a-b being mounted at the vertical junctions between the outward panels 194a-b and inboard panels 198a-b, and a second set 204a-b being mounted as a pair at the centerline junction between the inboard barrier sections 198a-b. The linear guide rods 202a-b and 204a-b are "off-the-shelf" items available from numerous suppliers, and are supported over their lengths by the structure of barrier 192, which will be described in greater detail below. The platform 200 of the assembly includes guide collars 206 mounted in upper and lower pairs, that engage each of the linear guide rods for vertical movement thereon. A ball nut assembly 210 vertically mounted at the junction between the inboard barrier sections 298a-b, at a centerline position intermediate the inboard pair of linear guides 204a-b, drives the lift platform 206 upwardly/downwardly by means of a traveling nut unit 212 on a threaded shaft 214 rotated by an electric servo motor 216 and supported in an end bearing 218, the whole being mounted on a frame plate 220, that is in turn mounted to the adjoining bulkhead sections 198a-b. Suitable ball screw assemblies are again available from several suppliers known to those skilled in the relevant art.

Figure 16:
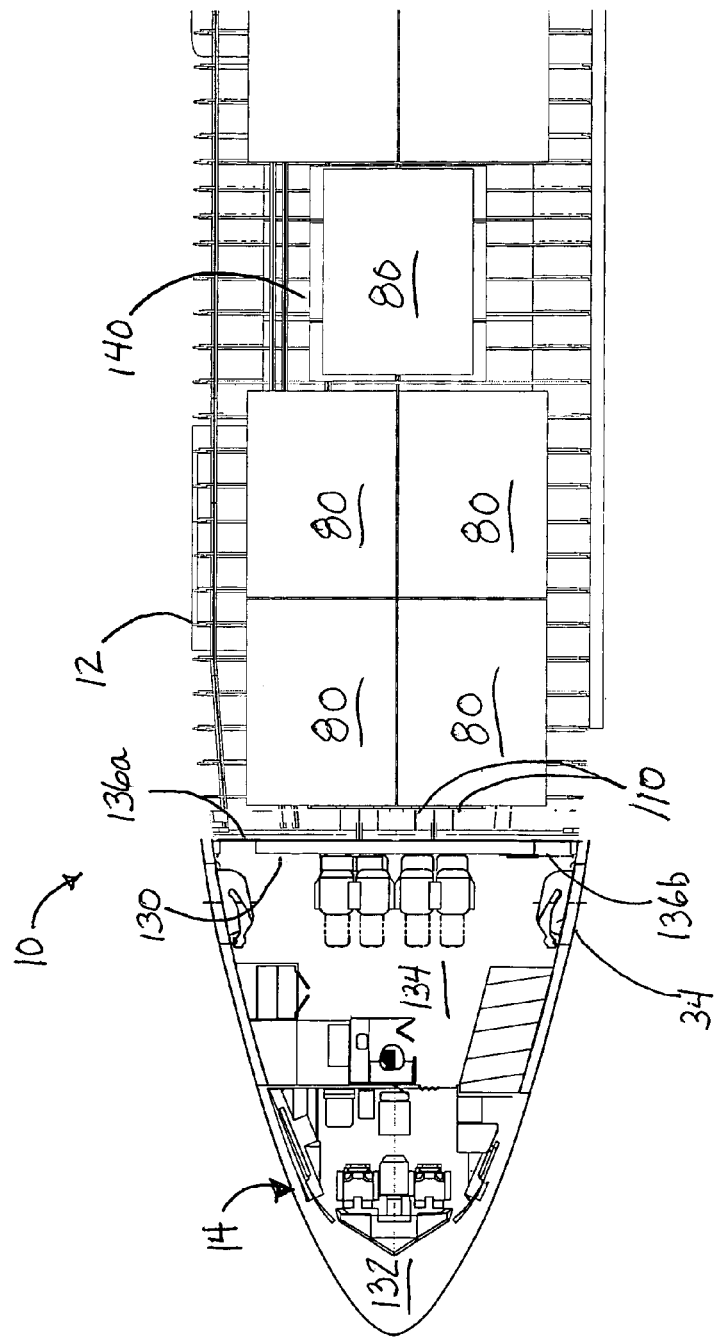
FIG. 16 is a partial side elevational view of the lift apparatus of FIG. 15, showing the relationship of the lift assembly and vertical guides of the assembly in greater detail.

As can be seen with further reference to FIG. 15, and also to FIG. 16, the collars 206 that receive the linear guides are mounted in vertical pairs to upper and lower horizontal, transverse frame members 222, 224 of the lift platform 200. The upper and lower horizontal members are joined by vertical frame members 226, so as to react loads inwardly and outwardly directed loads onto the linear guides and from there into the structure of the barrier. Horizontal frame members 228 extend from the lower ends of the vertical frame members 226 to form the edges of the deck of the lift platform, the joint between the vertical and horizontal frame members being strengthened by gusset plates 230. Angled brace rods 232 in turn extend between the upper ends of the vertical frame members 226 and the distal ends of the horizontal frame members 228, the joint between the angled braces and the former again being strengthened by gusset plates 234.

The distal ends of the two side frame members 228 are joined by a second transverse horizontal frame member 236 that extends generally parallel to the first horizontal frame member 224 and forms the edge of the deck of the lift platform 206. The deck itself is defined by a series of comparatively wide roller deck segments 238 that, as will be described in greater detail below, nest between the fixed tracks of the main deck of the aircraft for transfer of cargo onto and off of the deck of the lift platform. The angled stay members 232 thus cooperate with the horizontal frame members 228, 236 and 224 to support the elements of the deck under the loads of the containers/cargo carried thereon. The platform assembly is preferably further strengthened by a shear panel (not shown for ease of illustration) mounted over the vertical and horizontal members 226, 222, 224 at the back of the lift platform.

As noted above, and as can better be seen in FIGS. 17-18, the roller deck segments 238 of the deck of the lift platform nest between and are level with the fixed cargo tracks 240 on the main deck of the aircraft when the platform is in the lowered position. Additional horizontal deck segments 242 including cargo rollers are mounted intermediate the rail segments 238 so as to nest on the main deck 24 in the areas 244 between tracks 240.

Figure 18:
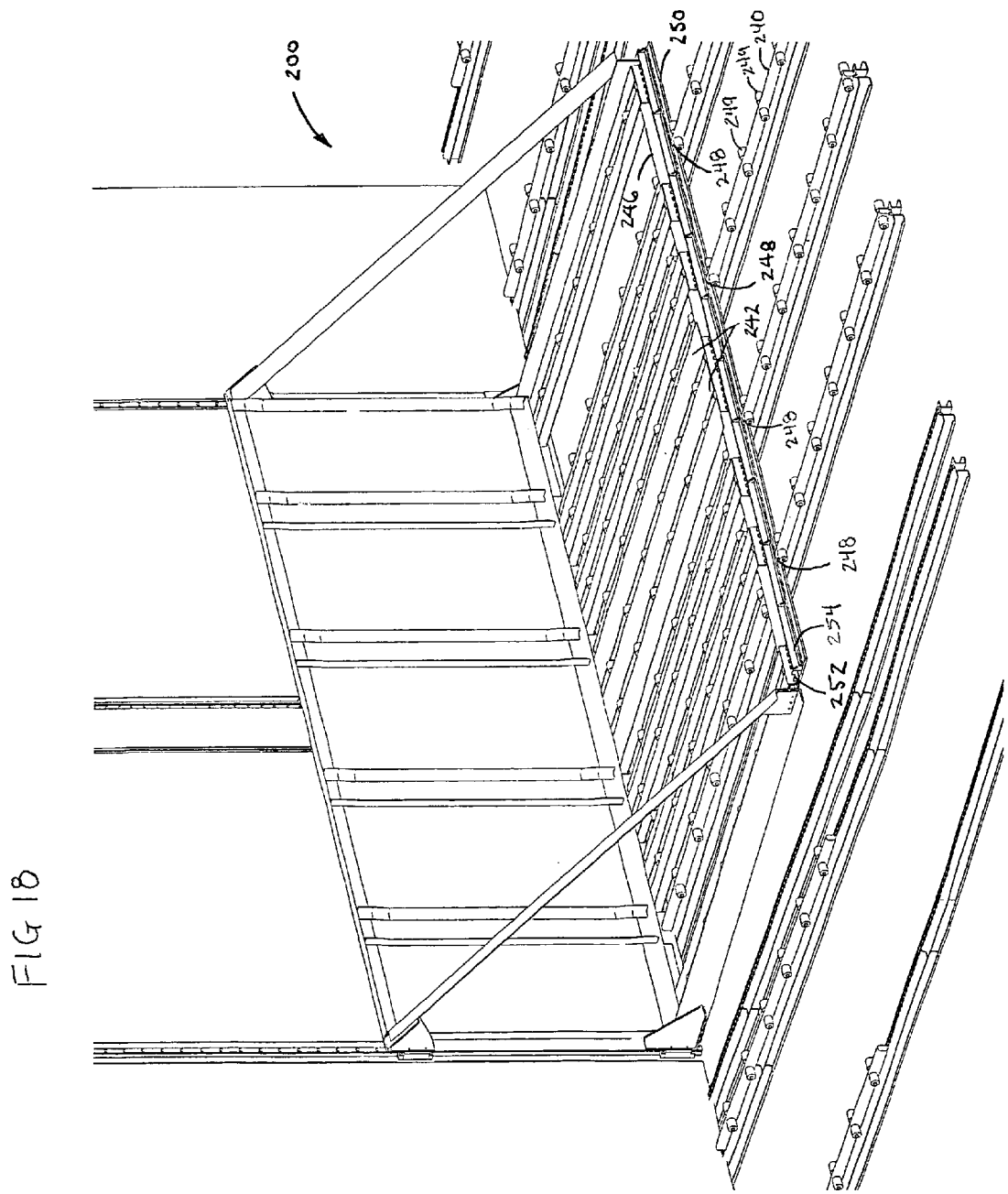
FIG. 18 is an enlarged, partial perspective view of the barrier and lift assembly of FIG. 14, with the platform of the lift assembly lowered so as to be nested between the cargo rails of the main deck of the aircraft as shown in FIG. 17, showing the platform edge gate dropped down into a cooperating cutout formed in the rails of the deck so as to allow passage of cargo containers onto/off of the platform.

As can be seen in FIG. 18, when the lift platform 200 is in the lowered position the transverse, horizontal frame bar 246 at the front of the platform is received in a series of cooperating cutouts 248 formed in the upper edges of the main deck cargo rails 240. The cutouts 248 also accommodate a gate member 250 that is mounted along the distal edge of the front frame member 246 on hinges 252 so that the gate lies substantially flat therein when lowered, as shown in FIG. 18. With the forward edge of the platform in this position and configuration cargo containers/pallets are able to transition freely from the fixed rails 240 of the aircraft deck onto the horizontal roller segments 238, 242 that define the deck of the lift platform, and visa versa, the length of the cutouts 248 being no greater than the standardized spacing between the roller 249 (e.g., 10 inches) of the fixed tracks 240, so that the container/platforms remain fully and evenly supported when passing thereover. Then, when the gate 250 is raised, it acts as a barrier against the containers/pallets inadvertently rolling off of the lift platform while the latter is being raised/lowered; a raised stop 254 along the back of the gate member (see also FIG. 16) cooperates with the ends of the deck roller segments to arrest the gate in the vertical orientation, with the gate then being held in place by a pin, catch or other latching suitable mechanism. Also, in combination with the horizontal frame member 246, the gate member when raised forms the vertical flange of an L-shaped (in cross-section) piece across the front of the lift platform, that imparts additional rigidity and strength against forces tending to bend/twist the lift deck, e.g., due to off-center loads.

Figure 19:
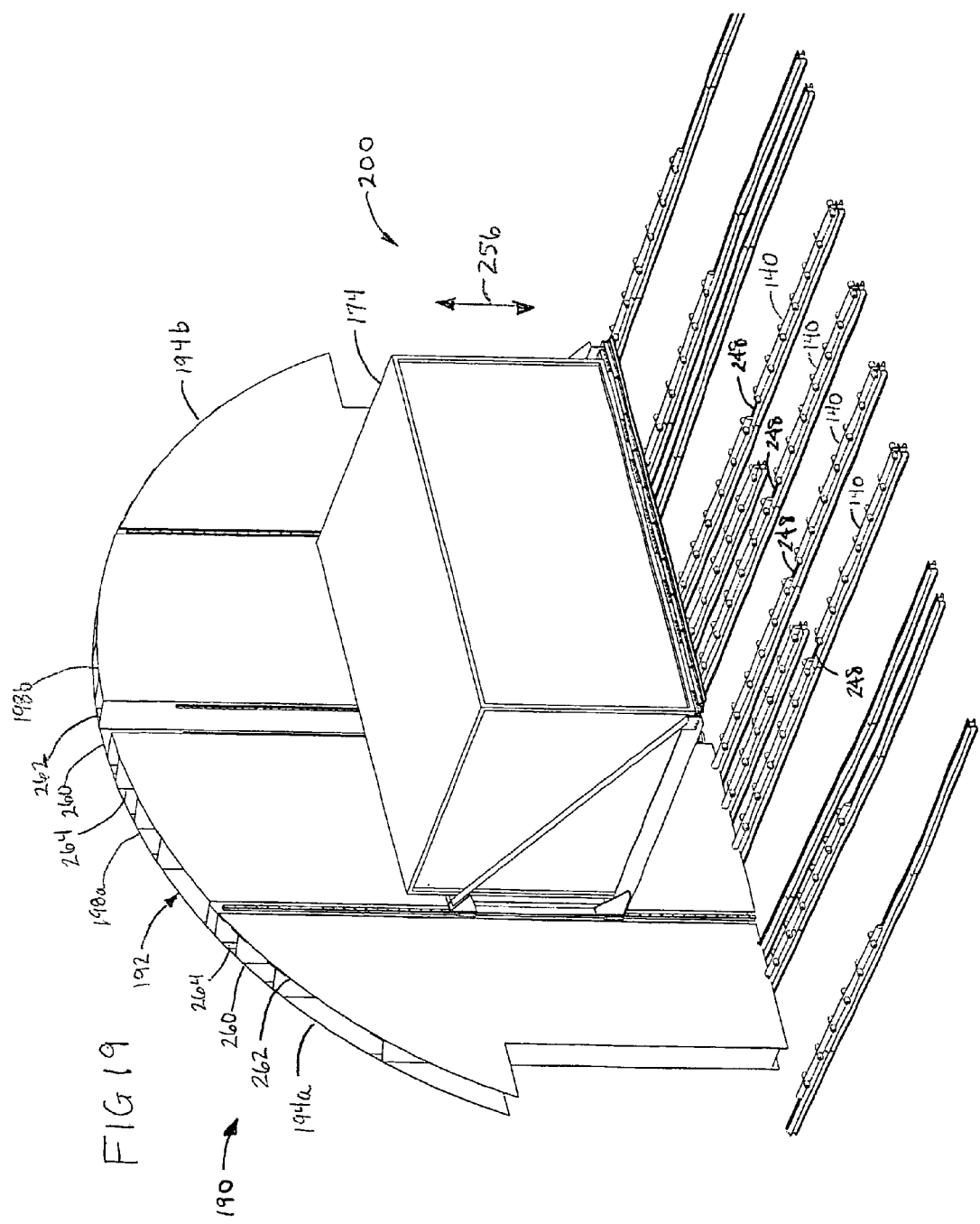
FIG. 19 is a perspective view of the barrier and lift apparatus of FIGS. 14-18, showing the manner in which a cargo container is raised/lowered on the platform of the apparatus.
Figure 20:
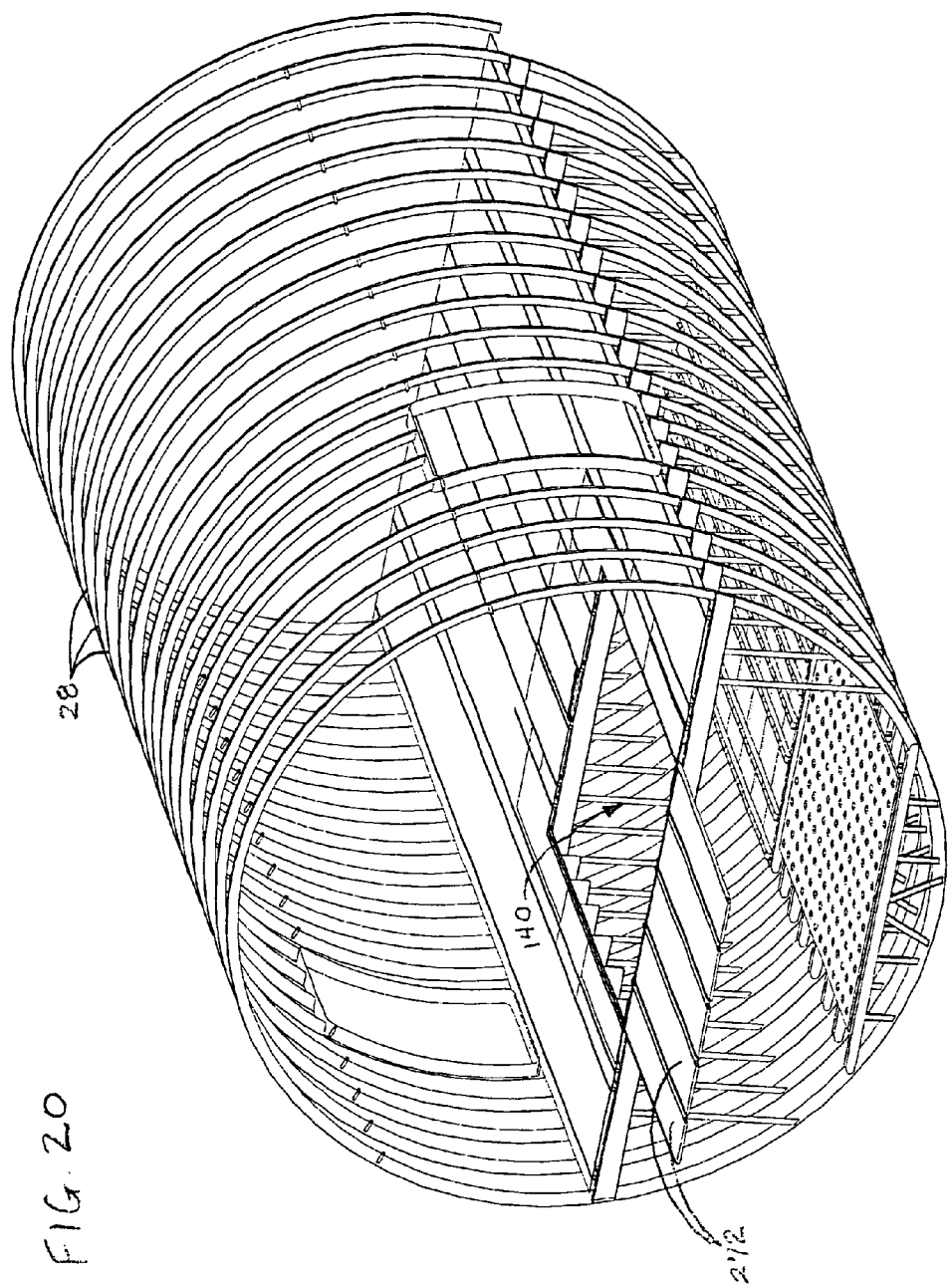
FIG. 20 is a partial, perspective view of a fuselage section of the aircraft of FIG. 1, showing a lift hole cover assembly in accordance with the present invention, that is formed of a plurality of plate members that are selectively extensible from beneath the floor panels of the deck to cover the lift opening, showing the cover assembly retracted to the open configuration.

Thus, as is shown in FIG. 19, lift assembly 190 provides a rigid, well stabilized structure for raising and lowering cargo, such as a container 174, to and from an upper lobe storage area in an efficient and safe manner, as indicated by arrow 256. Moreover, since the drive and guide components of the assembly are housed within the interior of the barrier 192 cargo containers/pallets on the main deck can be loaded fully up to the rearward side of the bulkhead, consequently there is no loss of interior volume/capacity owing to the lift mechanism. Furthermore, the final container/pallet raised to the upper level can remain safely in place on the deck of the lift platform during flight, thus maximizing usage of the upper lobe volume as well.

As was noted with the embodiment described above, the lift mechanism of the embodiment shown in FIGS. 14-19 may be employed in conjunction with upper lobe storage racks as disclosed herein, or may be used with other types of storage structures as well.

Figure 17:
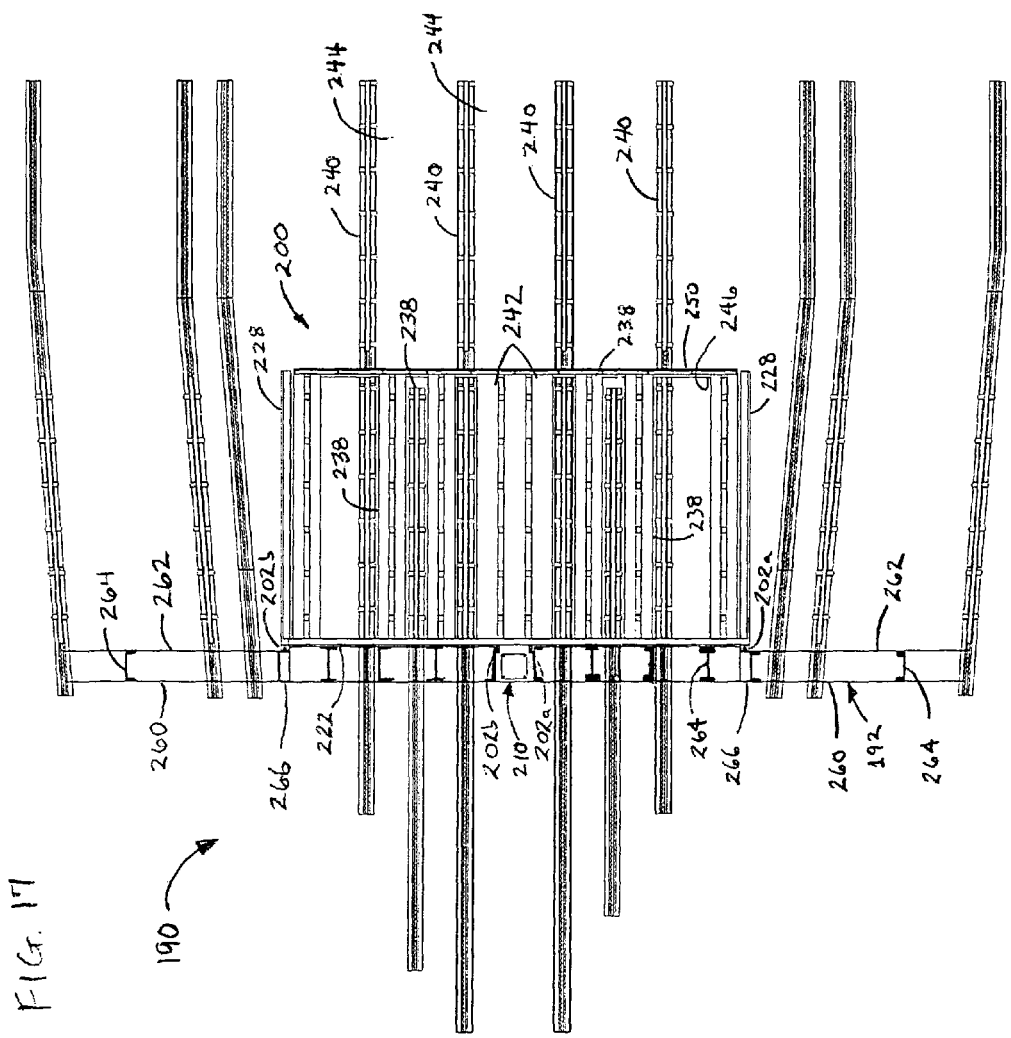
FIG. 17 is a top plan view of the barrier and lift apparatus of FIG. 14, showing the manner in which the horizontal members forming the deck of the lift assembly nest between the cargo rails of the main deck of the aircraft.

FIGS. 19 and 17 also show in greater detail the internal structure of the bulkhead 192 of the illustrated embodiment. As can be seen therein, each of the bulkhead sections 194*a-b* and 198*a-b* is formed of forward and aft panels 260, 262 mounted to the flanges of vertical beams 264 so as to form a rigid, lightweight structure, the upper edges of the panels being curved to follow the interior contour of the fuselage and the lower edges of being generally straight to conform to the main deck. The beams carry shear loads vertically into the structure of the aircraft, allowing the panels and core of the barrier to be constructed using lighter weight material. The spaces between the panels 260, 262 and intermediate the beams 264 are preferably filled with a lightweight material (e.g., lightweight aluminum honeycomb) which for ease of illustration is not shown.

Additional vertical beams 264 are mounted at the junctions between the outboard and inboard panels 194*a*-198*a* and 194*b*-198*b*, with the vertical guides 202*a-b* being mounted to the aft edges thereof. The primary loads of the lift mechanism are therefore transmitted to beams 266, and from there to the fuselage/deck, as well as somewhat through the beams and panels of the adjoining bulkhead segments. The secondary vertical guides 204*a-b* of the ball screw assembly are located proximate the edges of a gap 266 formed between the panels 262 of the inboard barrier segments 198*a-b*, where the latter meet proximate the centerline of the aircraft with vertical beams flanking the ball screw assembly, accommodating vertical movement of the connection between the traveling nut of the ball screw assembly and the platform 200 of the lift apparatus.

The bulkhead structure described above provides significant advantages in terms of low weight and effective transmission of loads from the lift mechanism into the body of the aircraft, however, it will be understood that the lift mechanism may also be used with forms of bulkhead construction in addition to that which is shown, e.g., with bulkheads having other types of cores.

As noted above, in the illustrated embodiment the platform 142 of the lower deck lift mechanism stows in a raised position, level with the main deck 24 of the fuselage (see FIG. 3). When lowered, however, in the course of shifting containers or for other purposes, the opening 140 remains exposed, presenting a hole through the deck that is a hazard to personnel moving fore-aft through the fuselage. In order to overcome this problem, the present invention provides a retractable cover assembly that extends into the opening 140 in order to permit personnel to safely transit between the adjoining forward and aft sections of the main deck.

Figure 21:
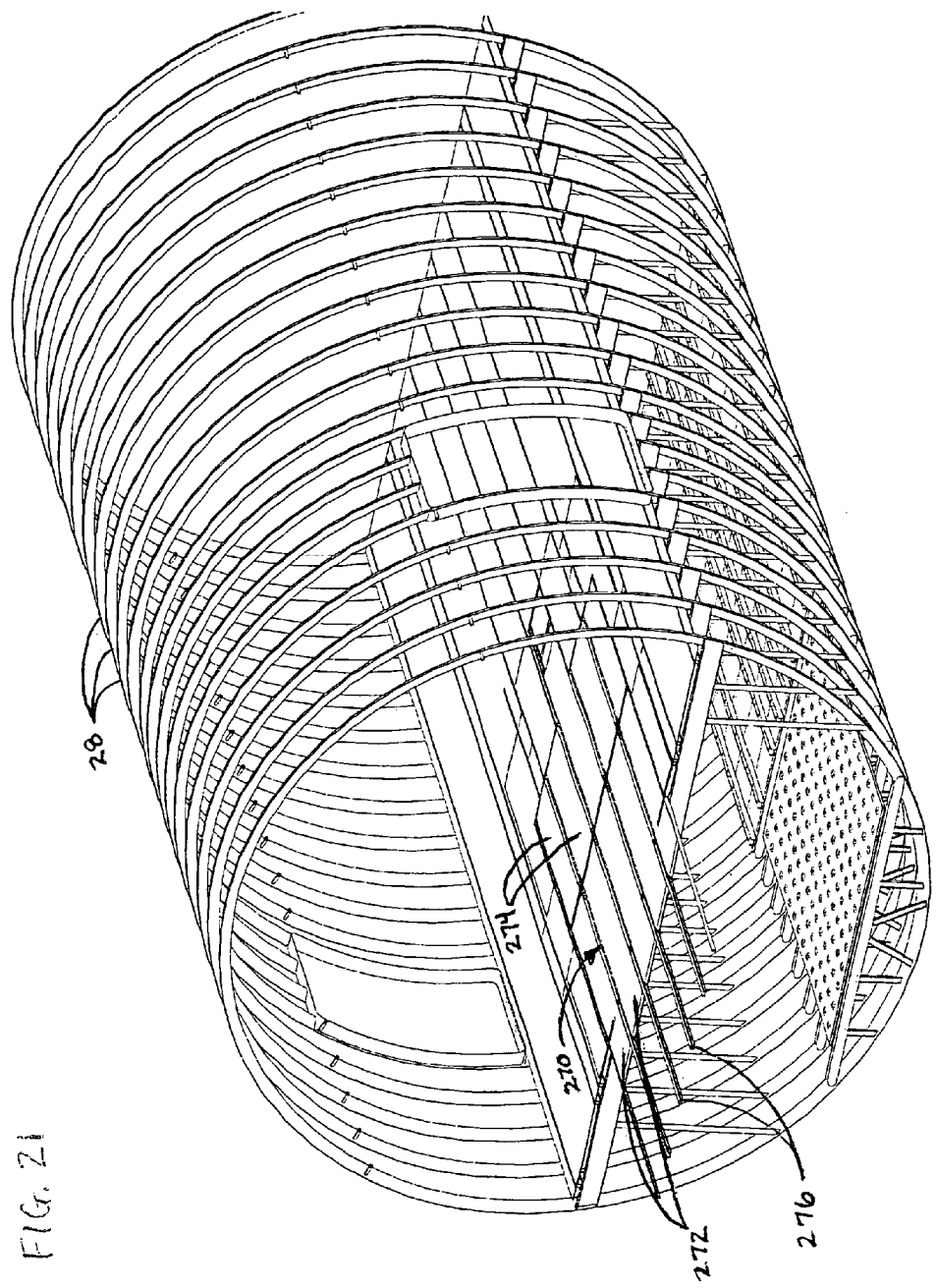
FIG. 21 is a second partial, perspective view of the fuselage section of FIG. 20, showing the lift hole cover assembly extended to the closed configuration.

As can be seen in FIGS. 20-23, the cover assembly 270 is made up of a plurality of substantially parallel, longitudinally extending plate members 272, 274. Each of the plate members 272, 274 in the illustrated embodiment has a length approximately equal to or greater than one-half the fore-aft dimension of the opening 270, so that when longitudinally extended the combined span fully covers the opening as shown in FIG. 21. Each of the panel members comprises an elongate, generally rectangular panel, suitably constructed of a corrugated alloy or composite sheet sandwiched between horizontal upper and lower panels to give adequate strength/rigidity to support the weight of one or more personnel.

Figure 23:
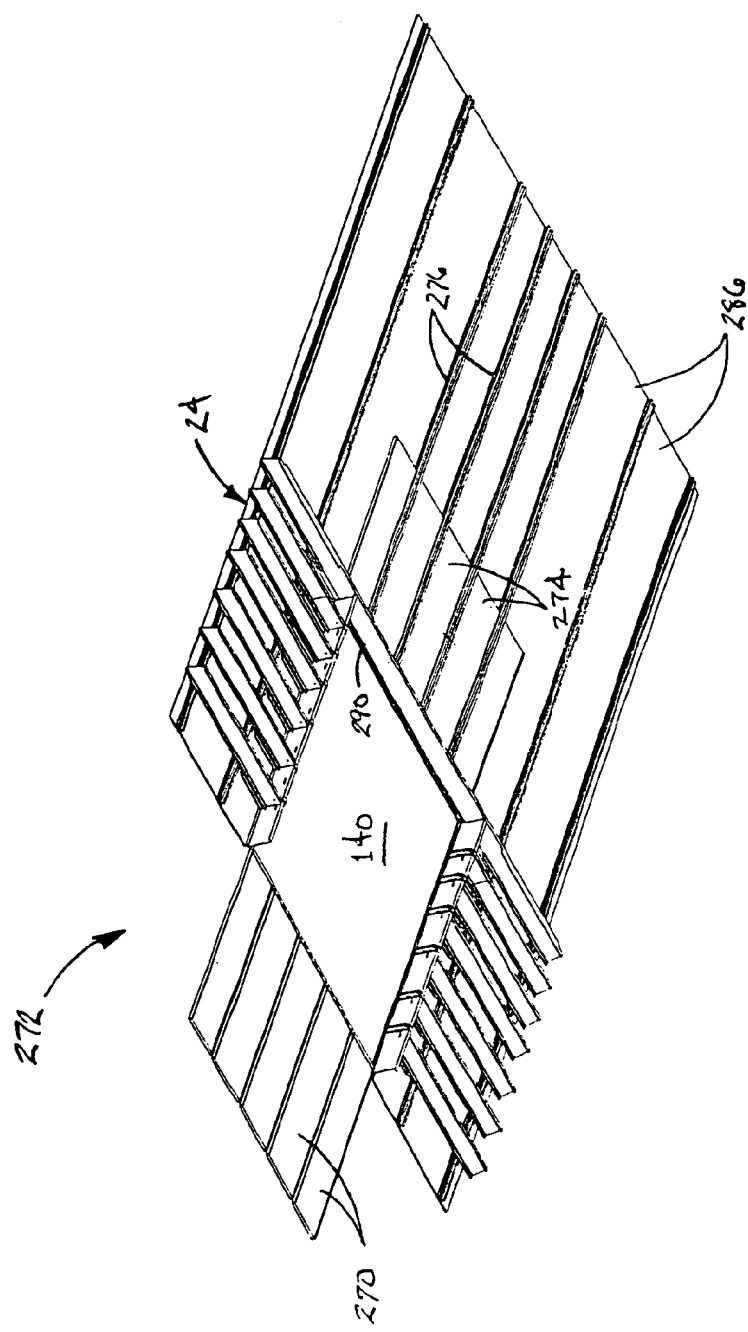
FIG. 23 is a lower perspective view of the deck and lift hole cover assembly of FIG. 22, showing the relationship of the panels of the cover assembly to the below-deck structure of the seat tracks in greater detail.
Figure 24:
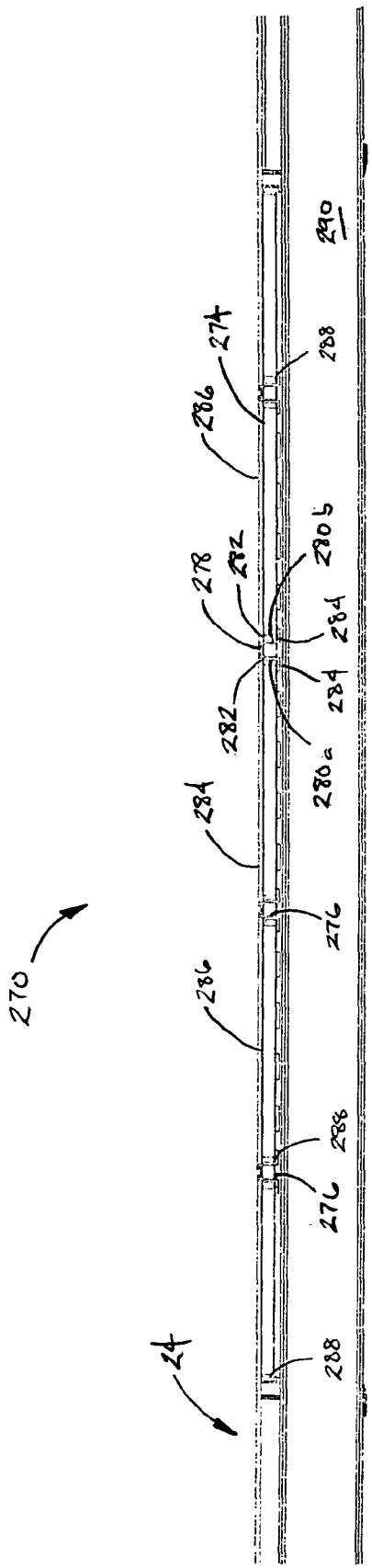
FIG. 24 is an end view of one side of the aft edge of the lift hole and associated cover assembly of FIGS. 20-23, showing the manner in which the segments of the cover assembly are supported for longitudinal movement from the below-deck side channels of the seat tracks.

As can be seen with further reference to FIGS. 23 and 24, the edges of the plate members 270, 272 are supported in rolling engagement with cooperating portions of preexisting longitudinally extending seat tracks 276. The extending seat tracks are installed in the main deck of the fuselage section as part of the original passenger configuration, and as can be seen in FIG. 24 they include upwardly facing channel portions 278 that receive cooperating flange portions (not shown) on the seats, that allow the latter to be mounted at the desired pitch. As is characteristic, for example, in a Boeing B-777, the depending portions of the seat tracks 276 further include outwardly facing lower channel portions 280*a*, 280*b*, defined by horizontal upper flange portions 282 in conjunction with horizontal lower flange portions 284 having raised outer lips. As can be seen in FIG. 24, the edges of rigid floor panels 286 rest on and are supported by the horizontal upper flanges 282 of the seat tracks, with the panels 286 spanning the gaps between adjoining seat tracks 274 to form the floor of the main deck 24.

The edges of the plate members 272, 274 are in turn supported from the underfloor portions of the seat tracks 276, by guides that allow the plate member to be selectively extended/retracted in a linear direction. For example, in the preferred embodiment that is illustrated, the edges of the plate members may be supported by ball-bearing linear guides, similar in operation to drawer slides, mounted to the depending sides of the seat tracks. In another example, the plate members may be supported by rollers along the longitudinal edges of the plate members that are received in the lower, generally C-shaped channels 280*a*, 280*b* of the seat tracks, the wheels of the rollers being spaced outwardly from the longitudinal edges of the plate members on horizontal axles to form gaps that accommodate the upturned lips of the lower flanges and the rollers having a diameter sized just slightly less than the height between the horizontal flanges 282, 284 so as to form a rolling engagement with the channels.

The plate members 272, 274 of the cover are thus supported parallel to and immediately below the floor panels 286, above the transverse beams 290 of the main deck 24 and over the underlying cargo compartments. The first set of the plate members 272 is installed between adjoining seat tracks at the forward edge of the main deck opening 140, while the corresponding set of plate members 274 is installed between the seat tracks at the rearward edge 186.

Figure 22:
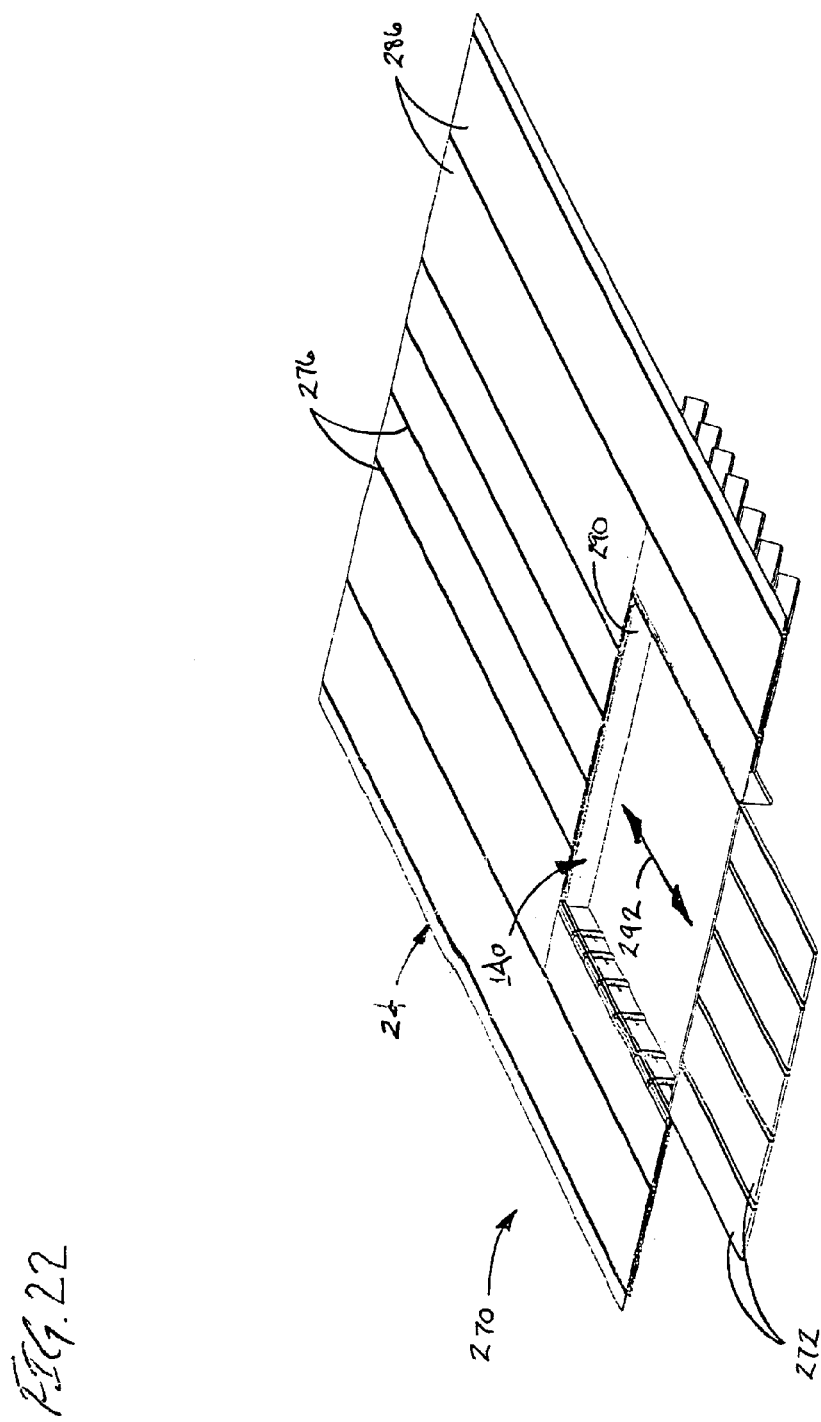
FIG. 22 is a upper perspective view of the main deck and the lift hole cover assembly of fuselage section of FIG. 20, with the frames of the fuselage removed for ease of illustration of the cover assembly.
Figure 25:
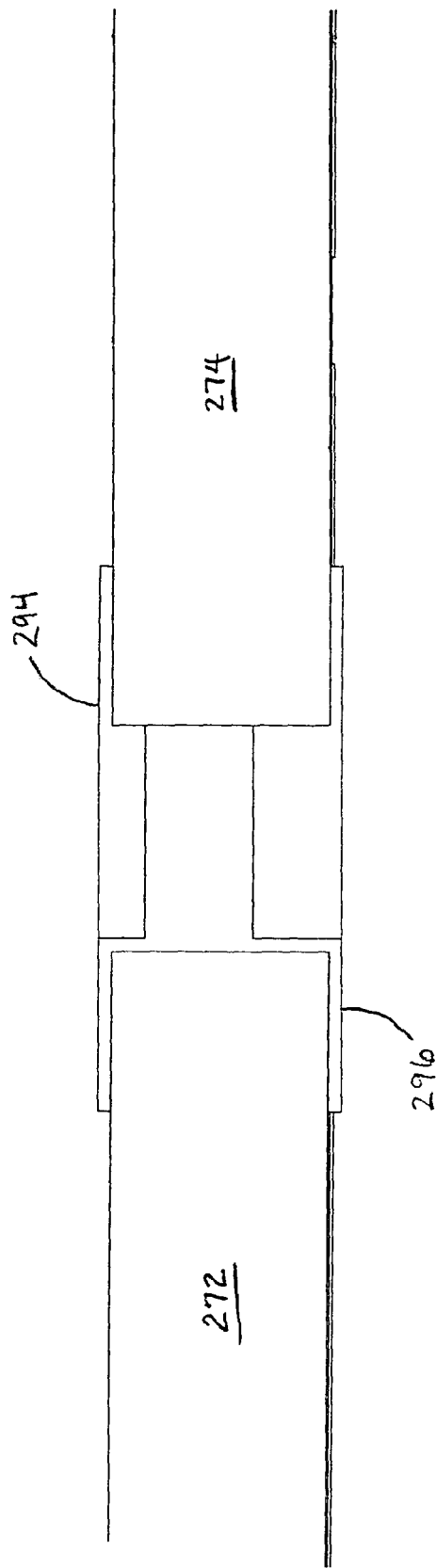
FIG. 25 is a partial, side cross-sectional view of the distal edges of opposing plate members of the cover assembly of FIGS. 20-24, showing the cooperating tongue-and-groove structure that aids in supporting the ends of the plate members when extended.

Thus mounted, the plate members 272, 274 are selectively extensible into and retractable from the opening 140, in the directions indicated by double-ended arrow 292 in FIG. 22. When extended, the panel members are supported in a cantilever manner by the roller guides at their base ends from the seat rail channels 276. In addition, as can be seen in FIG. 25, the distal ends of opposing pairs of the plate members 272, 274 include horizontally aligned channel pieces 294 and cooperating tongue pieces 296, that interfit in a tongue-and-groove manner when the plate members meet proximate the middle of the opening to provide additional rigidity and help to hold the extended panel members flat under the weight of a person thereover. The channel and tongue pieces may be mounted to the plate members 272, 274 individually, or they may be elongate pieces mounted across the ends of their respective sets of plate members so as to join the sets of plate members together for movement as a single unit.

Accordingly, when both sets of panel members are extended to meet at the middle of the opening, as shown in FIG. 21, they form a continuous, substantially rigid cover over which personnel can safely pass. Then, when desired, the panel members can be retracted into their respective edges of opening 140, to permit the lift to raise/lower containers therethrough and to also be stowed therein, as described above. Extension and retraction can be performed manually, or for example by a suitable hydraulically- or electrically-operated mechanism, such as a power drive unit (PDU) for example.

It is to be recognized that various alterations, modifications, and/or additions may be introduced into the constructions and arrangements of parts described above without departing from the spirit or ambit of the present invention.

What is claimed is:

1. An apparatus for carrying cargo in an aircraft, said apparatus comprising:
   a rack assembly mounted in an upper part of a fuselage of said aircraft so as to define a cargo area in an upper lobe thereof, said rack assembly comprising:
      a plurality of transverse rack frames mounted at intervals to frames of said fuselage of said aircraft, said transverse rack frames each comprising:
         a lower frame member that extends substantially horizontally across a lower side of said cargo area;
         first and second suspension frame members that extend generally upwardly from said horizontal frame member towards locations on said frames of said fuselage from which said rack assembly is suspended;
         crossbeam members mounted to said upper ends of said suspension frame members and having upper and lower ends; and
         pivotable link members interconnecting said upper and lower ends of said crossbeam members to said frames of said fuselage so as to support said upwardly extending suspension frame members of said rack frames from said frames of said fuselage, said pivotable link members being aligned to transmit loads from said frame of said rack assembly to said frame of said fuselage in a generally radial direction; and
      at least one lengthwise member that supports a plurality of cargo containers arranged longitudinally on said rack assembly within said cargo area in said upper lobe of said aircraft.

2. The apparatus of claim 1, wherein said locations on said frames of said fuselage from which said rack assembly is suspended comprise: pre-existing luggage bin attachment points on said frames of said fuselage.

3. The apparatus of claim 1, wherein said at least one lengthwise member that supports said plurality of cargo containers arranged longitudinally on said rack assembly comprises:
   at least one cargo rail extending generally longitudinally across a plurality of said lower frame members of a plurality of said rack frames.

4. The apparatus of claim 1, wherein said rack assembly further comprises:
   at least one substantially horizontal panel member mounted to said lower frame members of said plurality of rack frames so as to form a shear panel for said rack assembly.

5. The apparatus of claim 1, further comprising:
   a deflection control assembly that maintains said fuselage against distortion by said rack assembly.

6. The apparatus of claim 5, wherein said deflection control assembly comprises:
   at least one rigid member mounted transversely across an upper end of said frame of said fuselage above said storage area of said rack assembly so as to hold said frame against bowing inwardly under loads exerted by said rack assembly; and
   at least one tension member interconnecting each of said upwardly extending suspension frame members to said frame of said fuselage so as to hold said frame from bowing outwardly under loads exerted by said rack assembly.

7. The apparatus of claim 6, wherein said at least one rigid member mounted transversely across an upper end of said frame above said storage area of said rack assembly comprises:
   at least one rigid spreader bar member.

8. The apparatus of claim 6, wherein said at least one tension member interconnecting each of said upwardly extending suspension beam members to said frame of said fuselage comprises:
   at least one flexible tension cable.

9. The apparatus of claim 1, wherein said rack assembly extends substantially a full length of a main fuselage section of said aircraft.

10. An apparatus for carrying cargo in an aircraft, said apparatus comprising:
   a rack assembly mounted in an upper part of a fuselage of said aircraft so as to define a cargo area in an upper lobe thereof, said rack assembly comprising:
      a plurality of transverse rack frames mounted at intervals to frames of said fuselage of said aircraft, said transverse rack frames each comprising:
         a lower frame member that extends substantially horizontally across a lower side of said cargo area;
         first and second suspension frame members that extend generally upwardly from said horizontal frame member towards locations on said frames of said fuselage from which said rack assembly is suspended; and
      a deflection control assembly that maintains said fuselage against distortion by said rack assembly, said deflection control assembly comprising:
         at least one rigid member mounted transversely across an upper end of said frame of said fuselage above said storage area of said rack assembly so as to hold said frame against bowing inwardly under loads exerted by said rack assembly; and at least one tension member interconnecting each of said upwardly extending suspension frame members to said frame of said fuselage so as to hold said frame from bowing outwardly under loads exerted by said rack assembly; and at least one lengthwise member that supports a plurality of cargo containers arranged longitudinally on said rack assembly within said cargo area in said upper lobe of said aircraft.

11. The apparatus of claim 10, wherein said at least one rigid member mounted transversely across an upper end of said frame above said storage area of said rack assembly comprises:

at least one rigid spreader bar member.

12. The apparatus of claim 10, wherein said at least one tension member interconnecting each of said upwardly extending suspension beam members to said frame of said fuselage comprises:

at least one flexible tension cable.

13. The apparatus of claim 10, wherein said locations on said frames of said fuselage from which said rack assembly is suspended comprise:

pre-existing luggae bin attachment points on said frames of said fuselage.

14. The apparatus of claim 10, wherein said at least one lengthwise member that support said plurality of cargo containers arranged longitudinally on said rack assembly comprises:

at least one cargo rail extending generally longitudinally across a plurality of said lower frame members of a plurality of said rack frames.

15. The apparatus of claim 10, wherein said rack assembly further comprises:

at least one substantially horizontal panel member mounted to said lower frame members of said plurality of rack frames so as to form a shear panel for said rack assembly.

* * * * *